(12) United States Patent
Barnes et al.

(10) Patent No.: US 11,481,384 B2
(45) Date of Patent: Oct. 25, 2022

(54) APPARATUS AND METHOD FOR PERFORMING OPERATIONS ON CAPABILITY METADATA

(71) Applicant: ARM LIMITED, Cambridge (GB)

(72) Inventors: Graeme Peter Barnes, Cambridge (GB); Stuart David Biles, St. Edmunds (GB)

(73) Assignee: Arm Limited, Cambridge (GB)

(*) Notice: Subject to any disclaimer, the term of this patent is extended or adjusted under 35 U.S.C. 154(b) by 755 days.

(21) Appl. No.: 16/094,224

(22) PCT Filed: Mar. 29, 2017

(86) PCT No.: PCT/GB2017/050881
§ 371 (c)(1),
(2) Date: Oct. 17, 2018

(87) PCT Pub. No.: WO2017/182770
PCT Pub. Date: Oct. 26, 2017

(65) Prior Publication Data
US 2019/0095389 A1    Mar. 28, 2019

(30) Foreign Application Priority Data
Apr. 20, 2016 (GB) .............................. GB1606872.8

(51) Int. Cl.
*G06F 9/30* (2018.01)
*G06F 16/23* (2019.01)
(Continued)

(52) U.S. Cl.
CPC ........ *G06F 16/2386* (2019.01); *G06F 9/3004* (2013.01); *G06F 9/3016* (2013.01);
(Continued)

(58) Field of Classification Search
CPC .............. G06F 16/2386; G06F 9/3004; G06F 9/30043; G06F 9/30076; G06F 9/30101;
(Continued)

(56) References Cited

U.S. PATENT DOCUMENTS 5,522,051 A  5/1996 Sharangpani
6,826,672 B1  11/2004 Brown et al.
(Continued)

FOREIGN PATENT DOCUMENTS

JP  2014-528623  10/2014
TW  200517952  6/2005

OTHER PUBLICATIONS

International Search Report and Written Opinion of the ISA for PCT/GB2017/050881, dated Jun. 27, 2017, 16 pages.
(Continued)

*Primary Examiner* — Corey S Faherty
(74) *Attorney, Agent, or Firm* — Nixon & Vanderhye P.C.

(57) ABSTRACT

An apparatus is provided comprising storage elements to store data blocks, where each data block has capability metadata associated therewith identifying whether the data block specifies a capability, at least one capability type being a bounded pointer. Processing circuitry is then arranged to be responsive to a bulk capability metadata operation identifying a plurality of the storage elements, to perform an operation on the capability metadata associated with each data block stored in the plurality of storage elements. Via a single specified operation, this hence enables query and/or modification operations to be performed on multiple items of capability metadata, hence providing more efficient access to such capability metadata.

27 Claims, 18 Drawing Sheets

(51) Int. Cl.
  *G06F 13/28* (2006.01)
  *G06F 12/14* (2006.01)
  *G06F 9/345* (2018.01)
  *G06F 9/355* (2018.01)
  *G06F 16/22* (2019.01)
  *G06F 16/245* (2019.01)

(52) U.S. Cl.
  CPC ...... *G06F 9/30043* (2013.01); *G06F 9/30076* (2013.01); *G06F 9/30101* (2013.01); *G06F 9/30145* (2013.01); *G06F 9/30163* (2013.01); *G06F 9/30192* (2013.01); *G06F 9/345* (2013.01); *G06F 9/355* (2013.01); *G06F 12/1441* (2013.01); *G06F 12/1491* (2013.01); *G06F 13/28* (2013.01); *G06F 16/22* (2019.01); *G06F 16/245* (2019.01); *G06F 2212/1008* (2013.01); *G06F 2212/1016* (2013.01); *G06F 2212/1052* (2013.01); *G06F 2212/466* (2013.01); *G06F 2213/28* (2013.01)

(58) Field of Classification Search
  CPC ............... G06F 9/30145; G06F 9/3016; G06F 9/30163; G06F 9/30192; G06F 9/345; G06F 9/355; G06F 12/1441; G06F 12/1491; G06F 13/28; G06F 16/22; G06F 16/245; G06F 2212/1008; G06F 2212/1016; G06F 2212/1052; G06F 2212/466; G06F 2213/28; G06F 9/30105; G06F 9/3013; G06F 9/35; G06F 9/30003
  See application file for complete search history.

(56) References Cited

U.S. PATENT DOCUMENTS

| | | | |
|---|---|---|---|
| 8,010,772 B2* | 8/2011 | Kershaw | G06F 9/30054 712/226 |
| 9,525,696 B2* | 12/2016 | Kapoor | H04L 67/306 |
| 2003/0177342 A1 | 9/2003 | Morita | |
| 2005/0114616 A1* | 5/2005 | Tune | G06F 12/1441 711/163 |
| 2012/0296877 A1 | 11/2012 | Guthrie et al. | |

OTHER PUBLICATIONS

Search Report for GB 1606872.8, dated Oct. 10, 2016, 4 pages.
Watson et al., "Capability Hardware Enhanced RISC Instructions: CHERI Instruction-Set Architecture", University of Cambridge, Computer Laboratory, Technical Report No. 876, XP055330177, Sep. 30, 2015, 198 pages.
Office Action for TW Application No. 106112342 dated Jun. 18, 2021 and English translation, 19 pages.
Office Action for JP Application No. 2018-553940 dated Apr. 27, 2021 and English translation, 5 pages.
Office Action for TW Application No. 11020579530 dated Jun. 18, 2021, 10 pages.
Office Action for IN Application No. 201817043478 dated Jun. 23, 2021, 8 pages.
Office Action for KR Application No. 10-2018-7032843 dated Nov. 29, 2021 and English translation, 9 pages.

* cited by examiner

A)  SET   PR1 = 140000  ⟶  trigger error

B)  SET   PR1 = 140000

LD   R5,  PR1  ⟶  trigger error

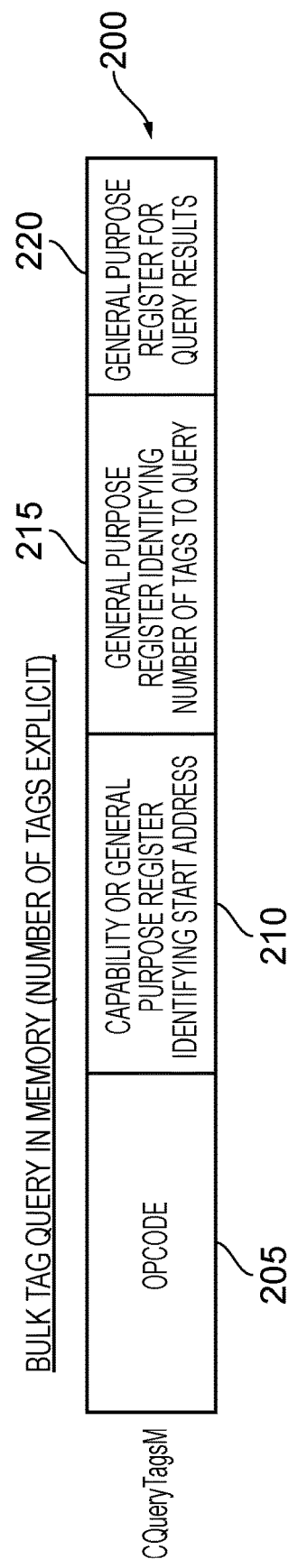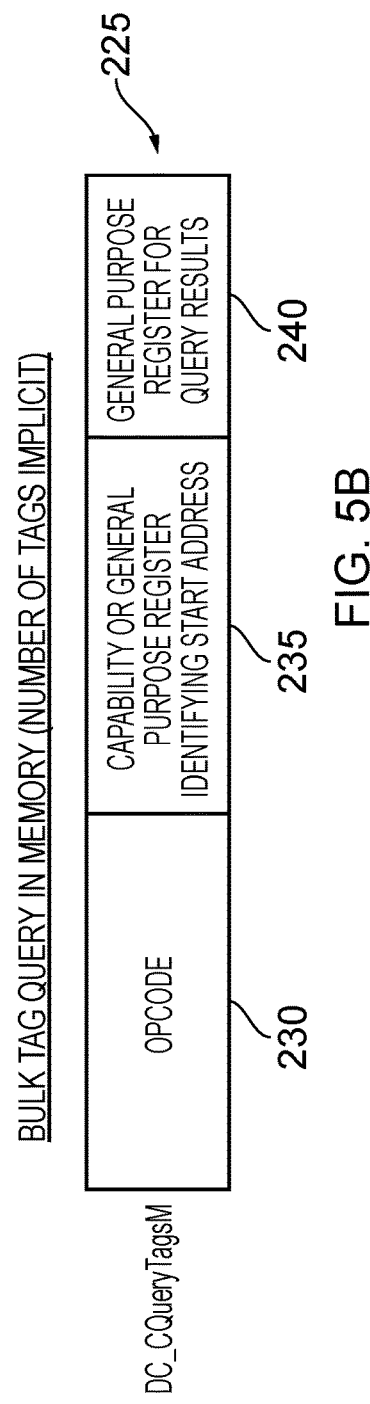
FIG. 5A
FIG. 5B

GENERAL PURPOSE REGISTER FOR HOLDING QUERIED TAG VALUES FOR
BULK QUERY (OR TAG VALUES TO APPLY FOR BULK MODIFICATION)

GENERAL PURPOSE REGISTER IDENTIFYING TAG VALUES TO APPLY

ONE VALUE
FOR EACH TAG
TO BE SUBJECTED
TO MODIFICATION OPERATION

OPTIONS

Ⓐ  0 = CLEAR TAG
    1 = SET TAG

Ⓑ  0 = LEAVE TAG UNMODIFIED
    1 = CLEAR TAG

Ⓒ  0 = LEAVE TAG UNMODIFIED
    1 = SET TAG

Ⓓ  0 = LEAVE TAG UNMODIFIED
    1 = CLEAR TAG IF SET
        SET TAG IF CLEAR

APPARATUS AND METHOD FOR PERFORMING OPERATIONS ON CAPABILITY METADATA

This application is the U.S. national phase of International Application No. PCT/GB2017/050881 filed 29 Mar. 2017, which designated the U.S. and claims priority to GB Patent Application No. 1606872.8 filed 20 Apr. 2016, the entire contents of each of which are hereby incorporated by reference.

The present technique relates to an apparatus and method for performing operations on capability metadata.

There is increasing interest in capability-based architectures in which certain capabilities are defined for a given process, and an error can be triggered if there is an attempt to carry out operations outside the defined capabilities. The capabilities can take a variety of forms, but one type of capability is a bounded pointer (which may also be referred to as a "fat pointer"). For a bounded pointer, the pointer value may identify, or be used to determine, the address of a data value to be accessed or an instruction to be executed, for example. However, the pointer value may also have associated range information which indicates an allowable range of addresses when using the pointer value. This can be useful for example for ensuring that the address determined from the pointer remains within certain bounds to maintain security or functional correctness of behaviour. In addition, certain permission/restriction information may be specified in association with the pointer value of a bounded pointer. The range information and any permissions/restrictions information for a bounded pointer may be referred to as capability information, and within a capability-based architecture such a bounded pointer (including its associated capability information) may be referred to as a capability.

Within a capability-based architecture, it is known to store capability metadata in association with each data block stored within storage elements of the apparatus. The capability metadata can be used to identify whether the associated data block specifies a capability, or instead contains data that does not represent a capability (also referred to herein as general purpose data). If desired, the capability metadata can also specify certain additional information.

When accessing individual data blocks, the associated capability metadata can be referenced in order to determine whether the data block represents a capability or general purpose data. However, it would be desirable to provide improved mechanisms for accessing and manipulating capability metadata within systems employing a capability-based architecture.

In a first example configuration, there is provided an apparatus, comprising: storage elements to store data blocks, each data block having capability metadata associated therewith identifying whether said data block specifies a capability, at least one capability type being a bounded pointer; and processing circuitry, responsive to a bulk capability metadata operation identifying a plurality of said storage elements, to perform an operation on the capability metadata associated with each data block stored in said plurality of storage elements.

In another example configuration, there is provided a method of performing operations on capability metadata, comprising: storing data blocks in storage elements, each data block having capability metadata associated therewith identifying whether said data block specifies a capability, at least one capability type being a bounded pointer; and responsive to a bulk capability metadata operation identifying a plurality of said storage elements, causing processing circuitry to perform an operation on the capability metadata associated with each data block stored in said plurality of storage elements.

In a yet further example configuration, there is provided an apparatus, comprising: storage element means for storing data blocks, each data block having capability metadata associated therewith identifying whether said data block specifies a capability, at least one capability type being a bounded pointer; and processing means for performing, responsive to a bulk capability metadata operation identifying a plurality of said storage element means, an operation on the capability metadata associated with each data block stored in said plurality of storage element means.

In a still further example configuration there is provided a computer program product storing in a non-transitory form a computer program for controlling a computer to provide a virtual machine execution environment for program instructions corresponding to an apparatus in accordance with the first example configuration discussed above.

The present technique will be described further, by way of example only, with reference to embodiments thereof as illustrated in the accompanying drawings, in which.

Figure 4:
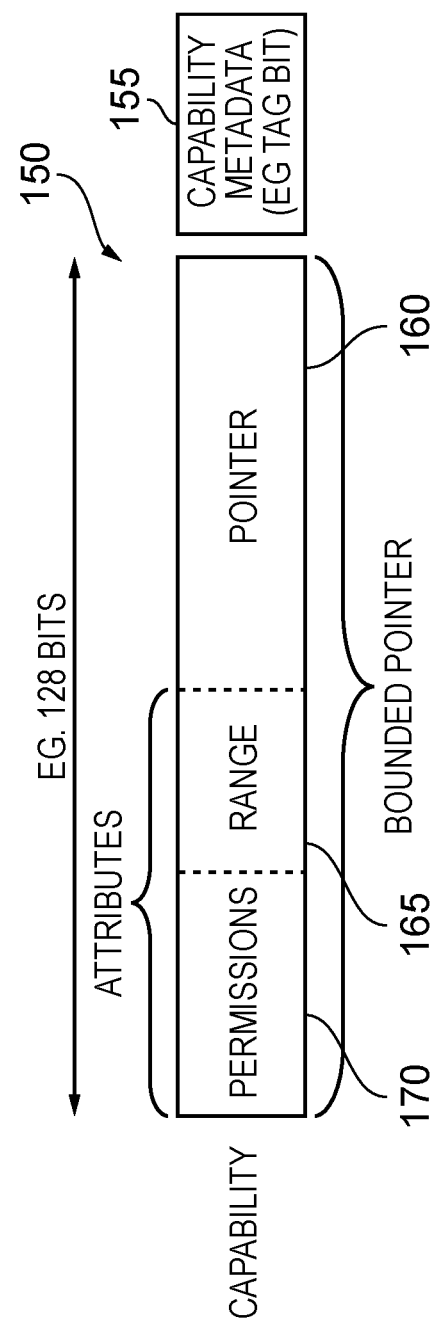
Figure 6A:
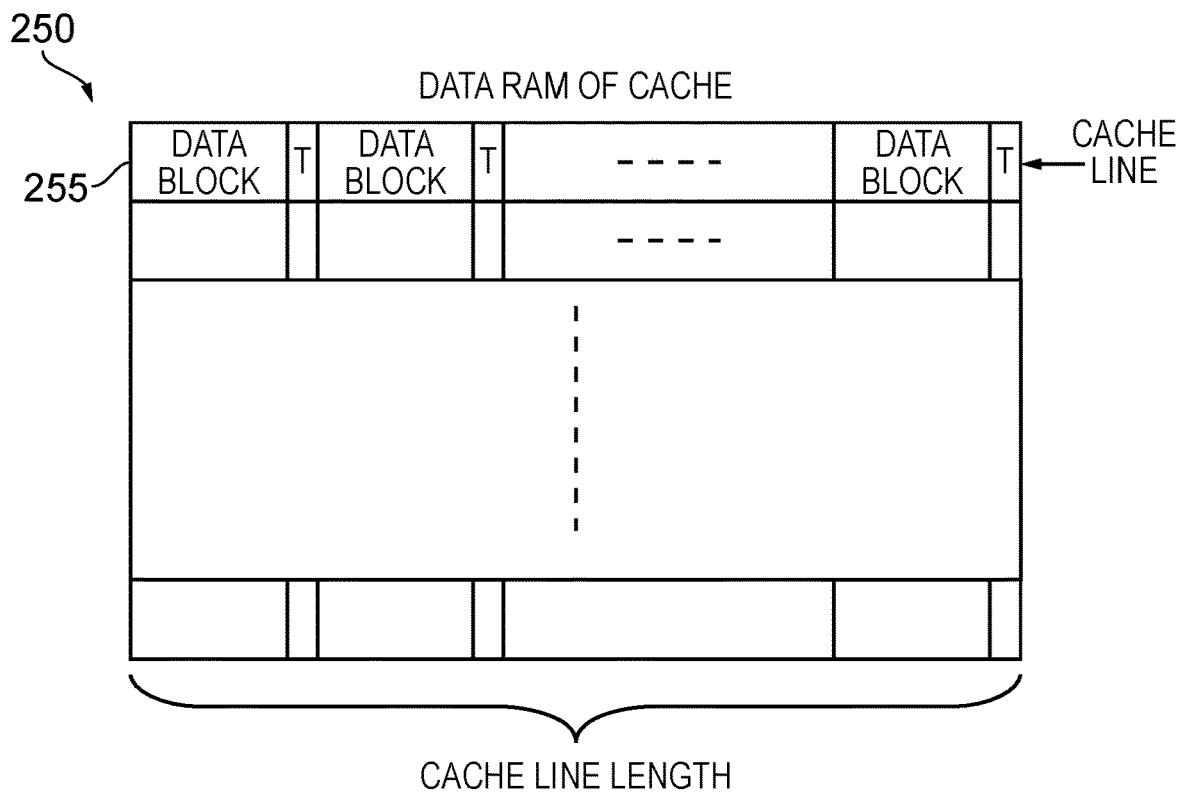
Figure 6B:
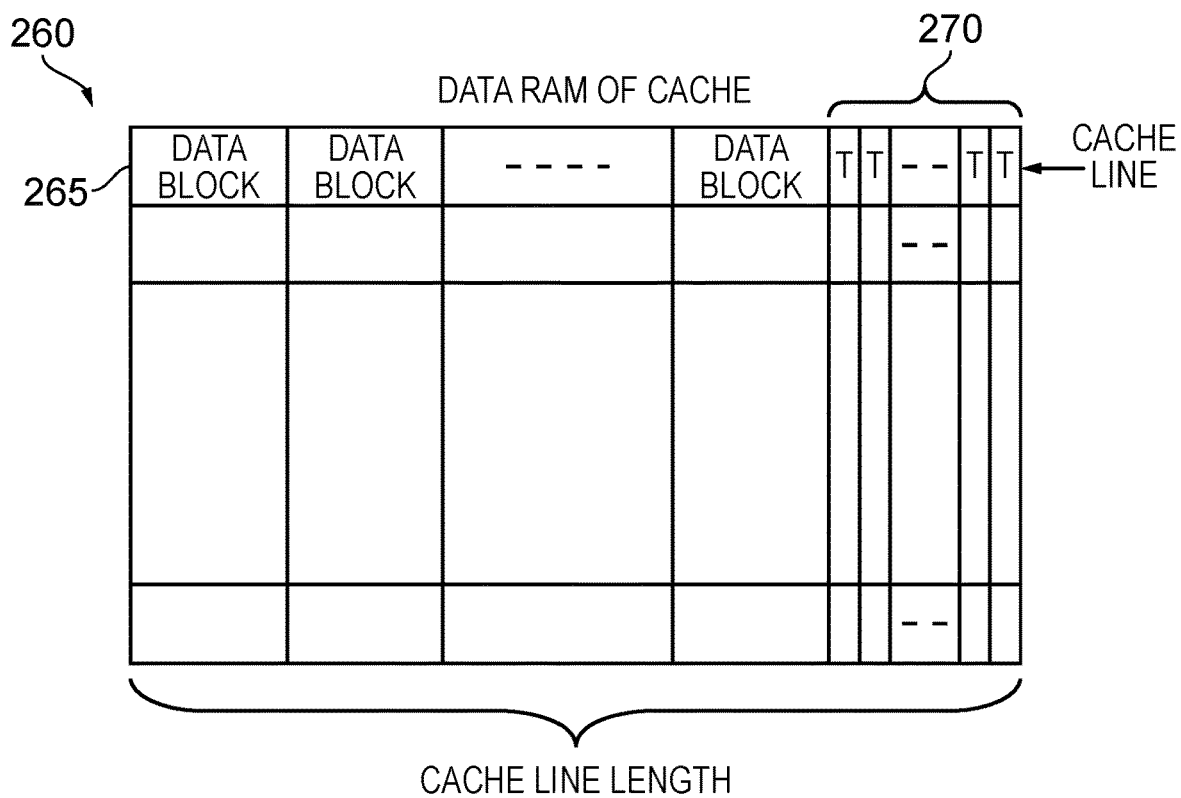
Figure 7:
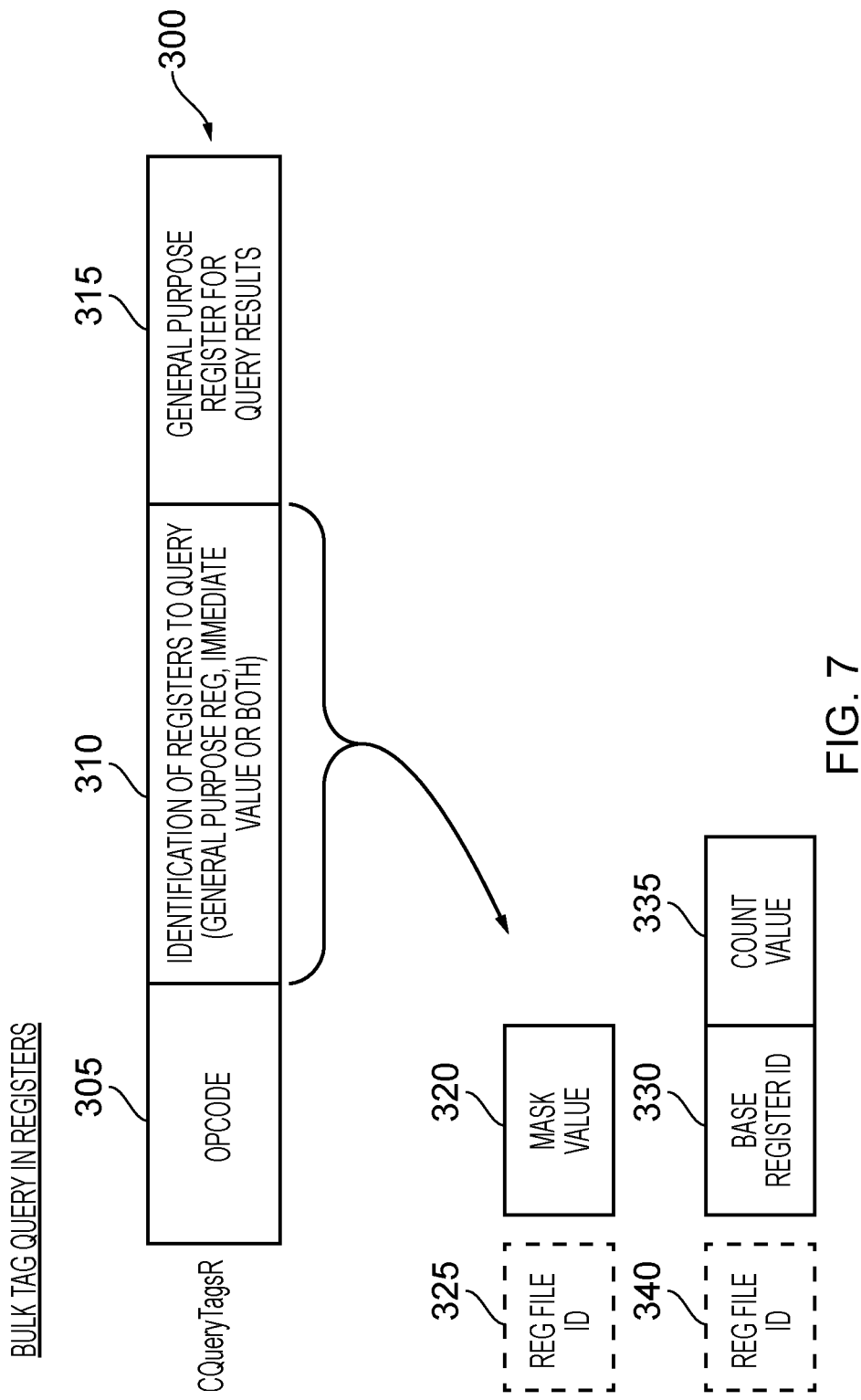
Figure 8A:
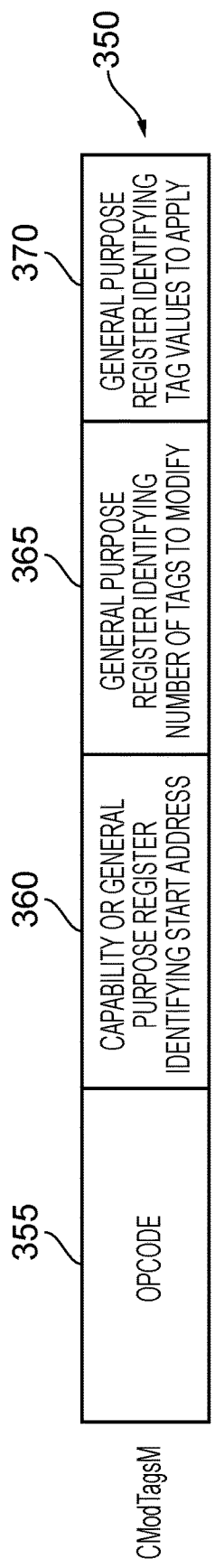
Figure 8B:
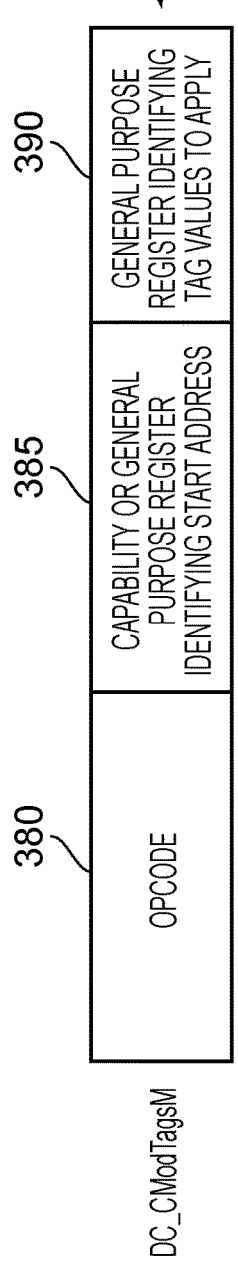
Figure 8C:
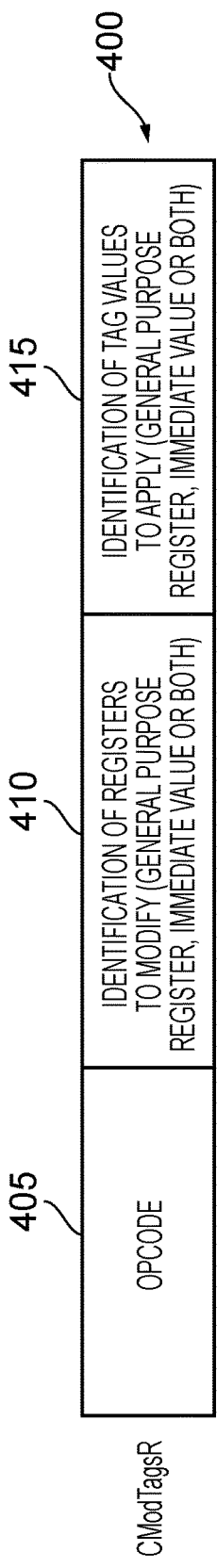
Figure 9A:
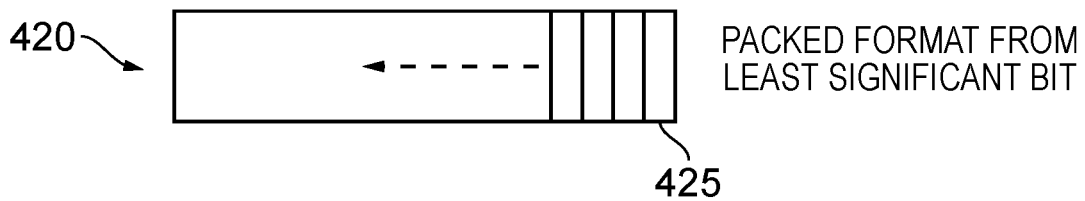
Figure 9B:
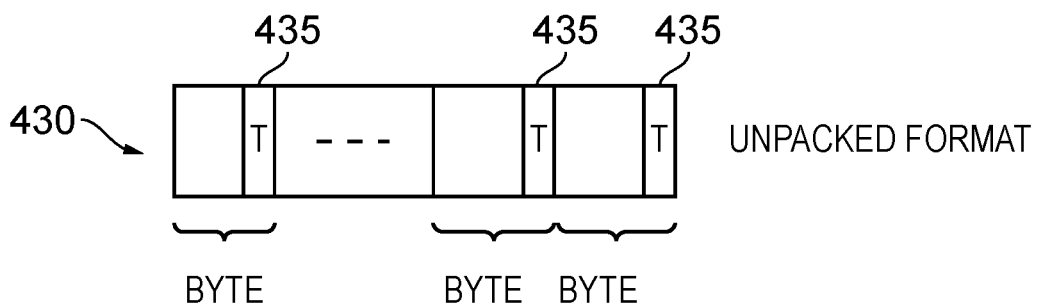
Figure 10:
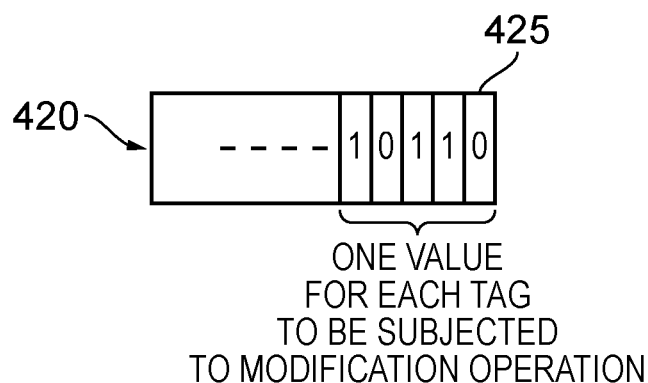
Figure 11:
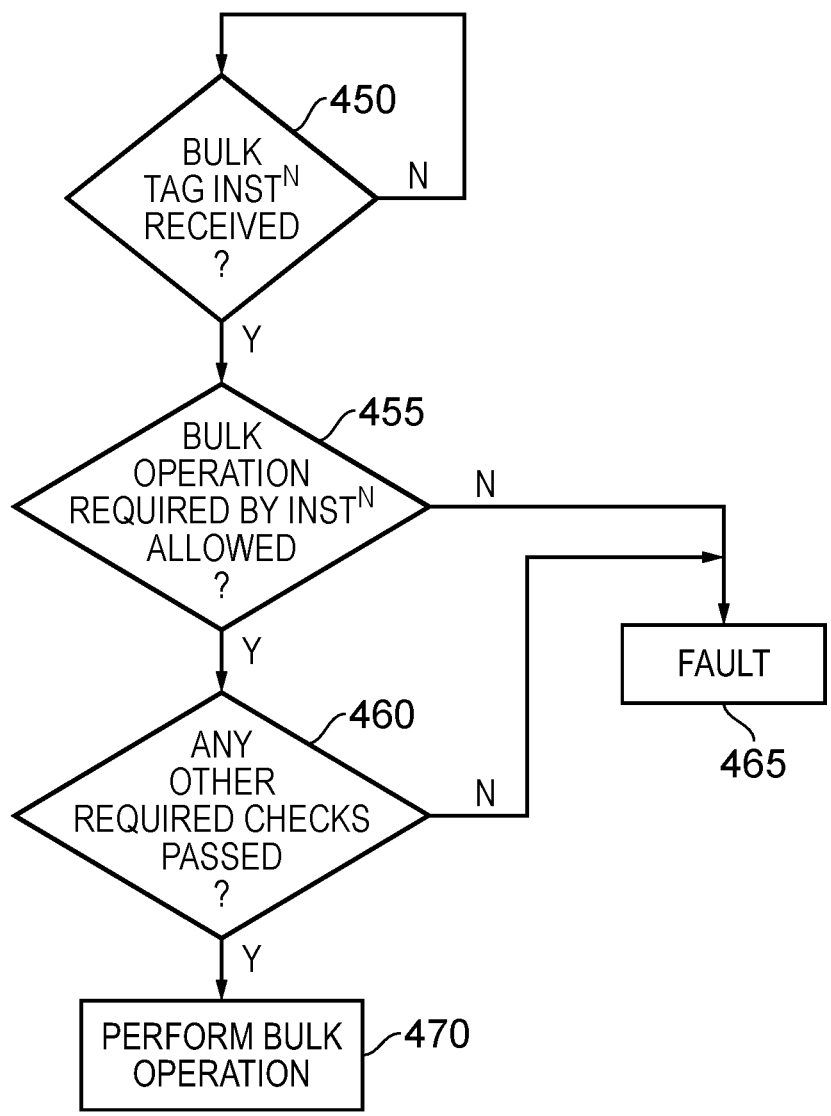
Figure 12A:
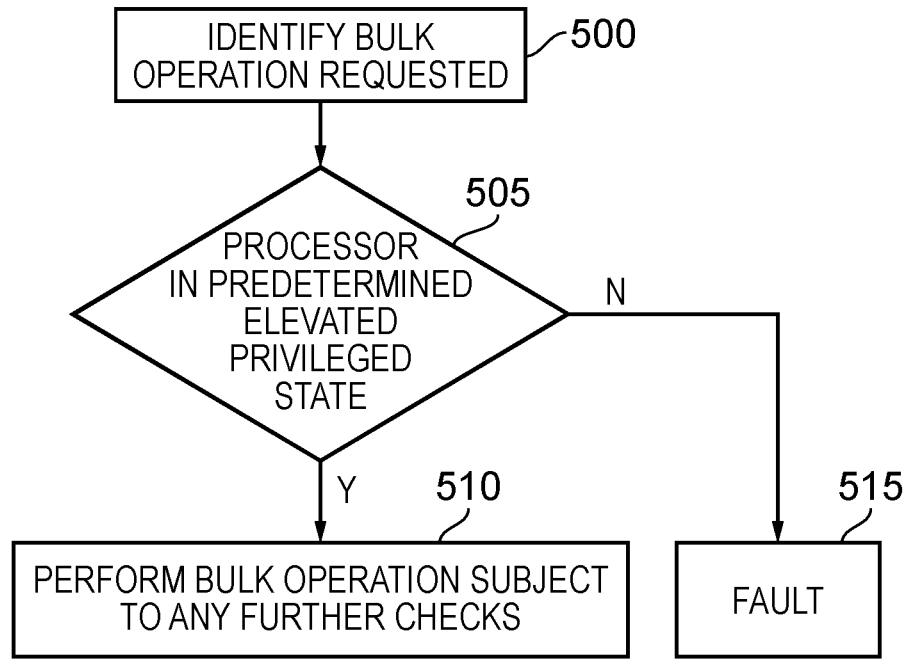
Figure 12B:
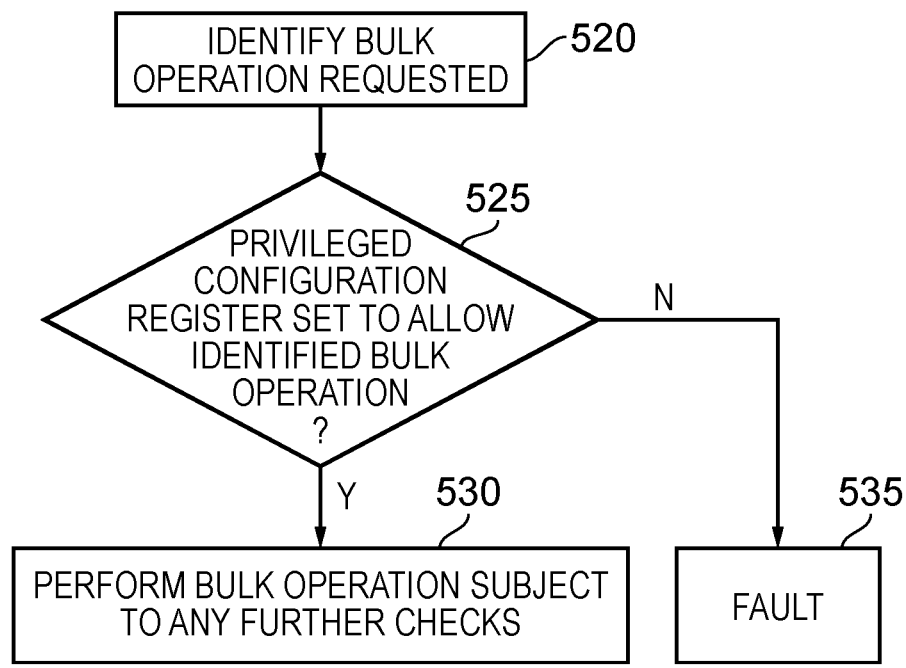
Figure 12C:
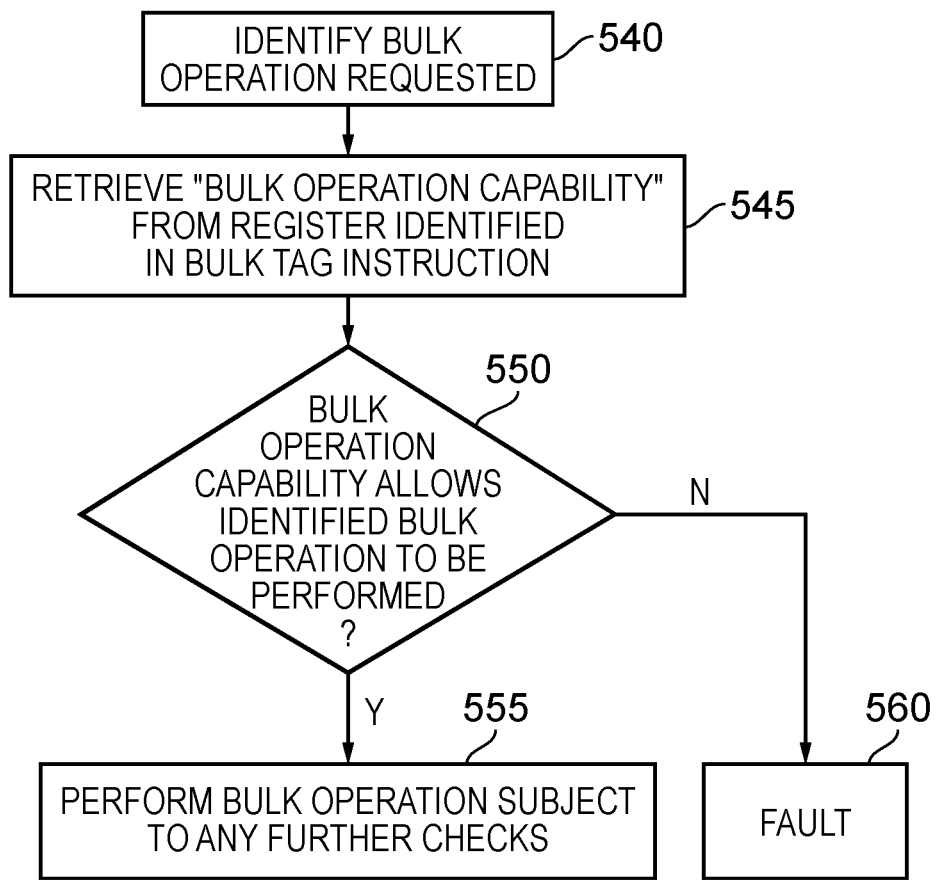
Figure 13:
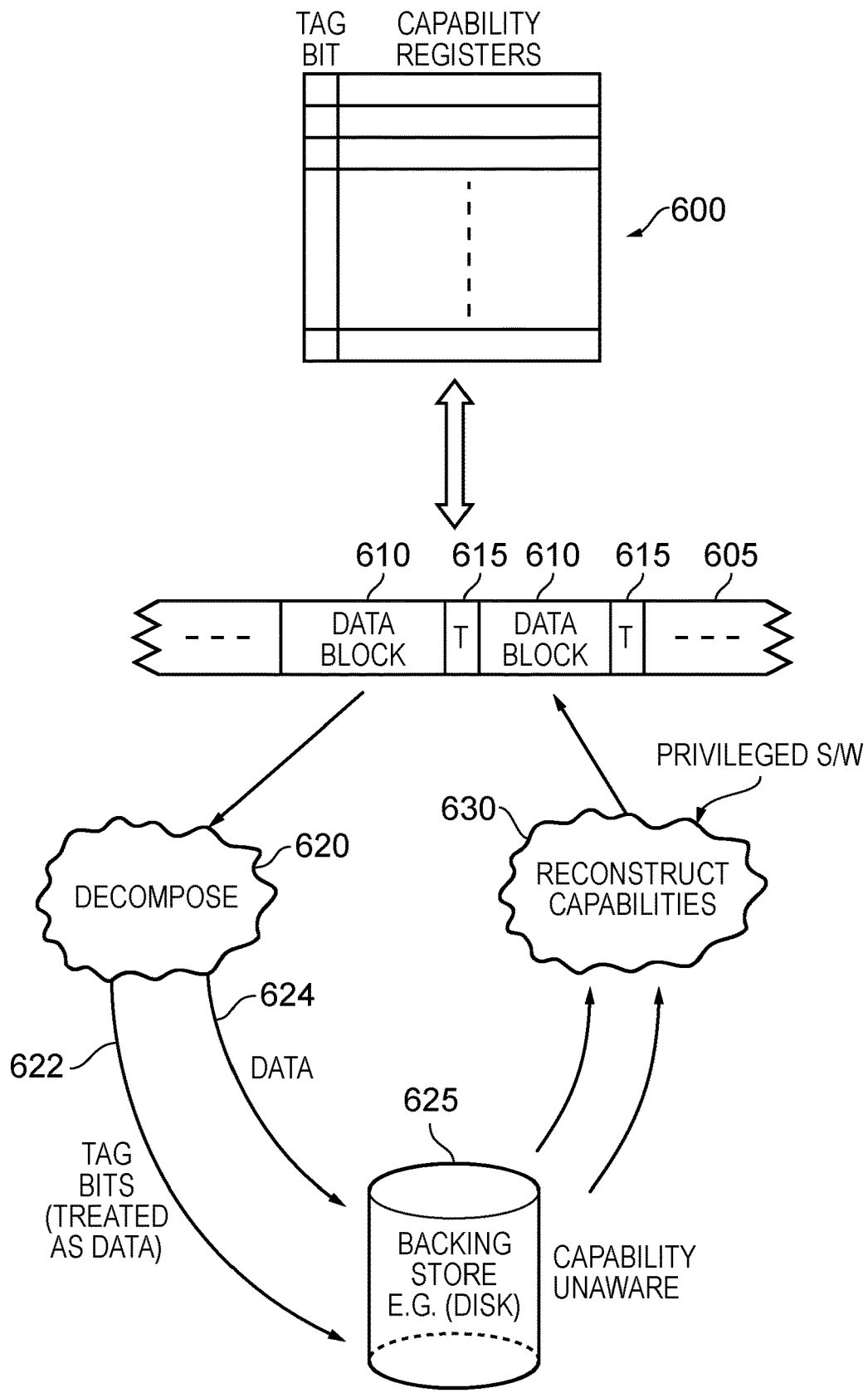
Figure 14:
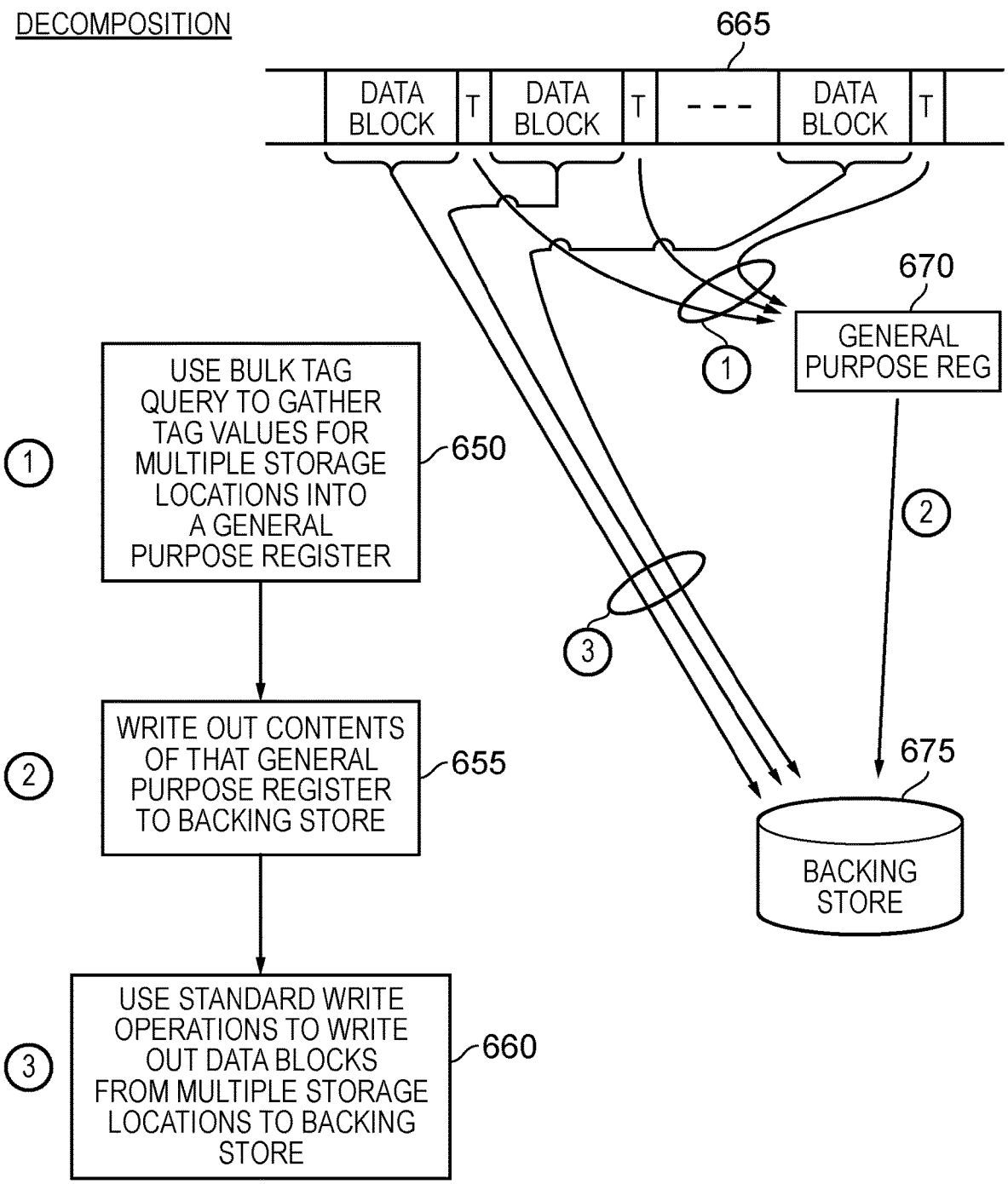
Figure 15:
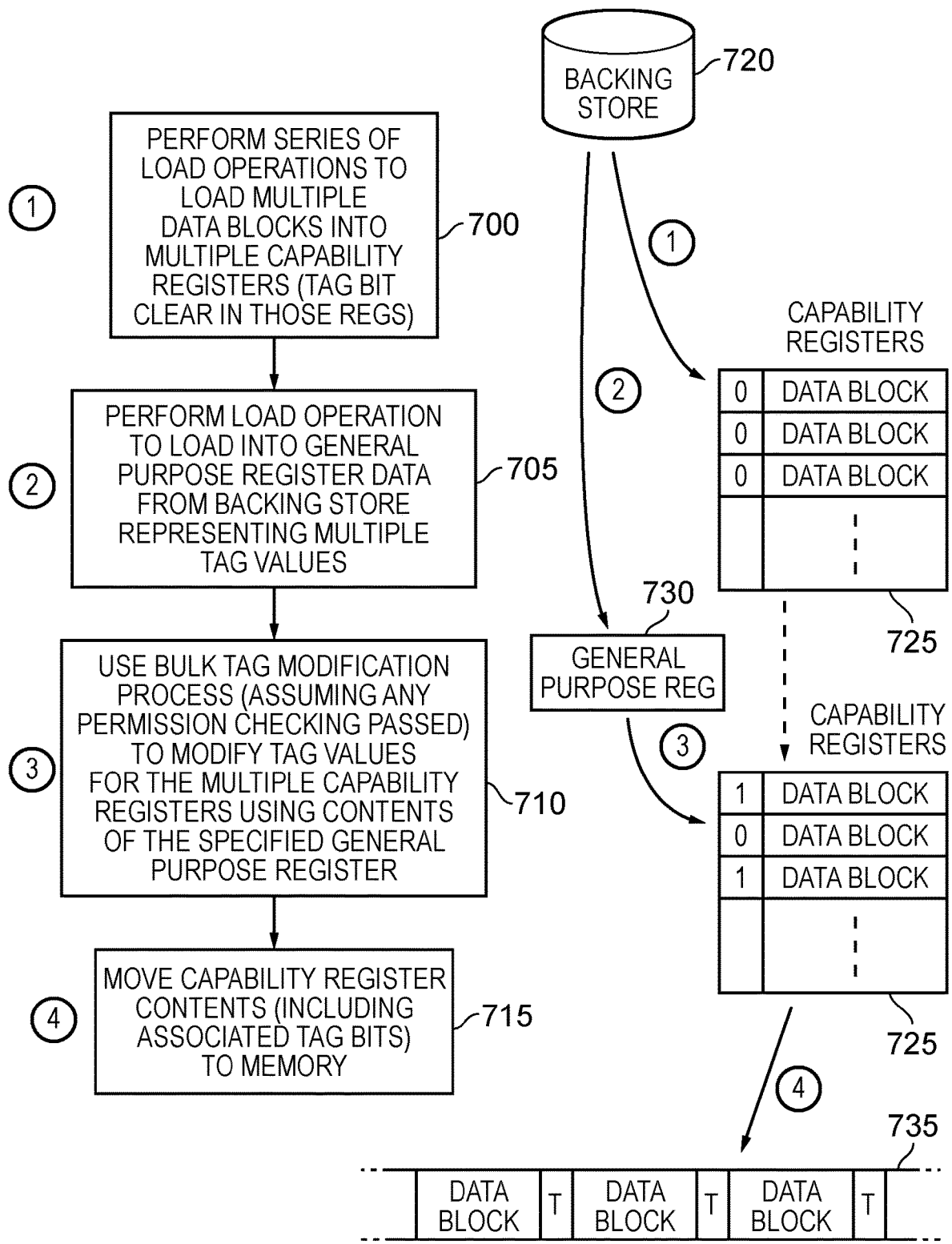
Figure 16:
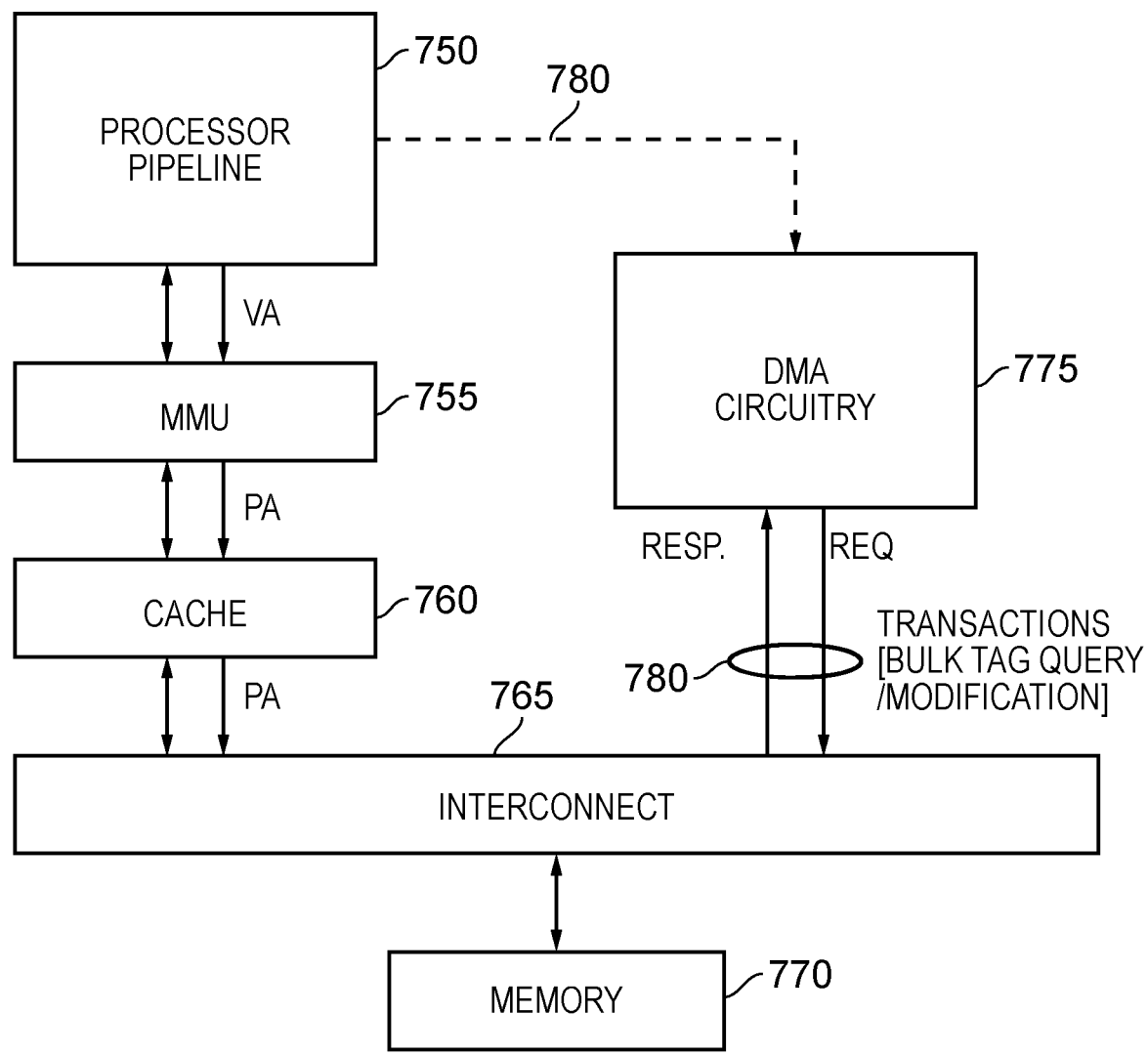
Figure 17:
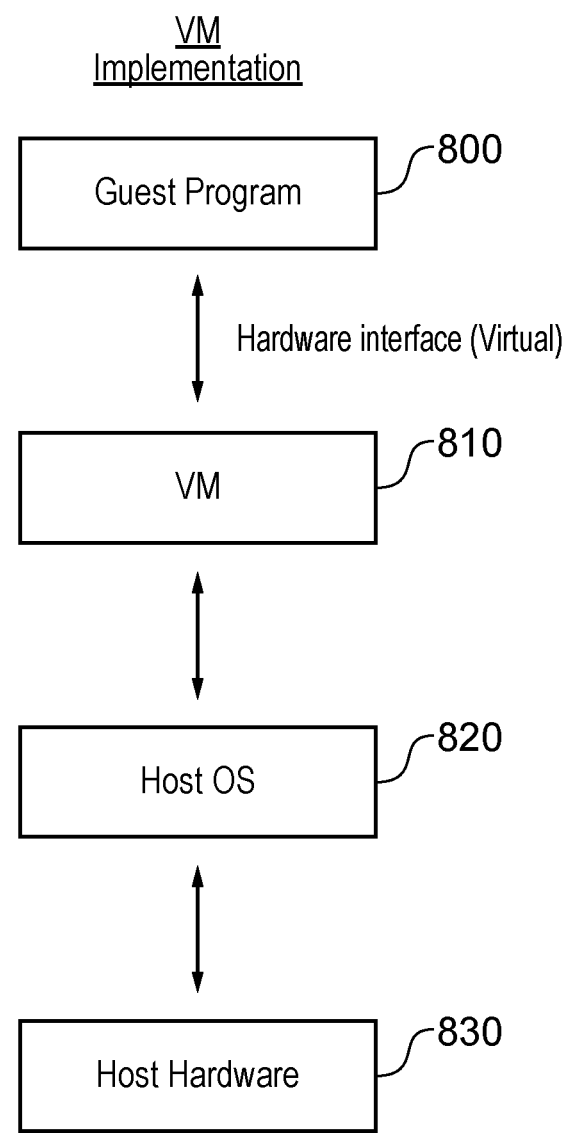

FIG. 4 schematically illustrates various fields provided within a capability that takes the form of a bounded pointer, along with associated capability metadata information, in accordance with on embodiment;

FIGS. 5A and 5B illustrate fields provided within two different instructions that may be provided in accordance with one embodiment to perform a bulk tag query operation on storage elements in memory;

FIGS. 6A and 6B illustrate how the tag bit (an example of capability metadata) may be stored in association with each data block within the cache lines of a cache in accordance with two different embodiments;

FIG. 7 schematically illustrates the fields provided within an instruction used to perform a bulk tag query operation on storage elements taking the form of capability registers within the apparatus, in accordance with one embodiment;

FIGS. 8A and 8B illustrate the fields provided within two different forms of instruction that may be used in accordance with one embodiment to perform bulk tag modification operations on storage elements taking the form of memory locations in memory, whilst FIG. 8C illustrates the fields provided within an instruction that may be used in accordance with one embodiment to perform a bulk tag modification operation on storage elements in the form of capability registers;

FIGS. 9A and 9B illustrate different ways in which a general purpose register may be populated to hold either the queried tag values obtained by performing a bulk tag query operation, or an indication of the tag values to be applied during a bulk tag modification operation, in accordance with one embodiment;

FIG. 10 schematically illustrates four examples of how the information within a general purpose register such as illustrated in FIG. 9A may be interpreted during the performance of a bulk tag modification operation in accordance with one embodiment;

FIG. 11 is a flow diagram illustrating a process that may be performed by the processing circuitry in one embodiment in order to determine whether the bulk tag operation specified by a bulk tag instruction is allowed to proceed or not, in accordance with one embodiment;

FIGS. 12A to 12C are flow diagrams illustrating the steps that may be performed in order to implement step 455 of FIG. 11 in accordance with one embodiment;

FIG. 13 schematically illustrates both a decomposition process and a reconstruction process in respect of capabilities transferred between capability aware storage elements and a capability unaware backing store in accordance with one embodiment;

FIG. 14 is a flow diagram schematically illustrating the decomposition process of FIG. 13 in accordance with one embodiment;

FIG. 15 is a flow diagram schematically illustrating the reconstruction of capabilities process of FIG. 13 in accordance with one embodiment;

FIG. 16 is an apparatus in accordance with an alternative embodiment, where a processor pipeline offloads a bulk tag query or modification operation to DMA circuitry, causing the DMA circuitry to implement that bulk tag query or modification operation via a series of transactions; and FIG. 17 schematically illustrates a virtual machine implementation of the apparatus in accordance with one embodiment.

Before discussing the embodiments with reference to the accompanying figures, the following description of embodiments is provided.

As mentioned earlier, there is an increasing interest in capability-based architectures in which certain capabilities are defined for a given process, and an error can be triggered if there is an attempt to carry out operations outside the defined capabilities. Various types of capabilities may be defined, but one type of capability is a bounded pointer (which in one embodiment incorporates both a pointer value and associated range and permissions information). An apparatus adopting such a capability-based architecture will typically have storage elements (also referred to herein as bounded pointer storage elements) that are used to store the capabilities. The storage elements can be registers (also referred to herein as bounded pointer registers or capability registers) and/or can be memory locations in general purpose memory, for example a location on a stack memory. Certain instructions can be used to reference such storage elements in order to access a desired capability, and perform operations dependent on that capability. For example, considering a bounded pointer, execution of such an instruction can cause the bounded pointer to be retrieved, and for the pointer value therein to then be used to derive an address in memory required during execution of the instruction. The pointer value may be used directly to identify the memory address, or may be used to derive the memory address, for example by the addition of an offset to the pointer value. The operation will then be allowed to proceed provided that the memory address is within the range specified by the range information, and any permissions specified in the permissions information are met.

Capability metadata may be provided in association with each data block stored in a storage element, in order to identify whether the data block represents a capability, or instead represents general purpose data. In accordance with the embodiments described herein, the apparatus is arranged to perform a bulk capability metadata operation to allow bulk querying and/or modification of the capability metadata associated with a plurality of storage elements.

More particularly, in one embodiment, an apparatus is provided comprising storage elements to store data blocks, each data block having capability metadata associated therewith identifying whether said data block specifies a capability, at least one capability type being a bounded pointer. Processing circuitry is then responsive to a bulk capability metadata operation identifying a plurality of said storage elements to perform an operation on the capability metadata associated with each data block stored in the plurality of storage elements.

In accordance with the described embodiment, rather than accessing individual items of capability metadata in response to an operation targeting that specific item of capability metadata and/or the associated data block, a bulk capability metadata operation can be specified identifying a plurality of storage elements. The processing circuitry can then be responsive to such a bulk capability metadata operation to perform an operation on the capability metadata associated with each data block stored in the plurality of storage elements. The bulk capability metadata operation targets the multiple items of capability metadata directly, and does not require the associated data blocks to be accessed during the operation. This hence provides a particularly efficient mechanism for performing operations on multiple items of capability metadata responsive to a single bulk request identifying the plurality of storage elements whose associated capability metadata is to be accessed.

Such operations can be useful in a variety of situations. For example, the operations may be useful when paging memory between the capability aware storage elements and a capability unaware backing store, or when migrating virtual machines across a network lacking intrinsic capability support. The provision of the bulk capability metadata operation can significantly increase the efficiency and performance of such operations.

The bulk capability metadata operation can take a variety of forms, but in one embodiment is a bulk query operation, and the processing circuitry is responsive to the bulk query operation to obtain the capability metadata associated with each data block stored in the plurality of said storage elements, and to generate output data containing the obtained capability metadata. Hence, when performing such a bulk query operation, the various items of capability metadata relating to the identified plurality of storage elements are retrieved and gathered together to form the output data. The output data may then be used for a variety of purposes, for example it may be written to a general purpose register, from where it can then be written out to a capability unaware entity such as a backing store, or indeed in some embodiments the output data may be able to be written directly to such a backing store.

However, the bulk capability metadata operation does not need to be a bulk query operation. In an alternative embodiment, the bulk capability metadata operation is a bulk modification operation, and the processing circuitry is responsive to the bulk modification operation to modify the capability metadata associated with each data block stored in said plurality of said storage elements, in dependence on modification data specified for the bulk modification operation. Hence, in such embodiments, modification data can be specified which is then used to selectively update the capability metadata associated with each of the identified plurality of storage elements, hence providing a very efficient mechanism for updating multiple items of capability metadata in response to a single identified operation.

The bulk modification operation can take a variety of forms. In one embodiment, it may cause the capability metadata associated with each data block stored in the plurality of storage elements to be set to identify that each data block specifies a capability, or alternatively may cause the capability metadata associated with each data block to be cleared to identify that each data block specifies data other than a capability (also referred to herein as general purpose data).

In an alternative embodiment, the modification data may identify, for each capability metadata to be accessed by the bulk modification process, the modification to be performed in respect of that capability metadata. Accordingly, in such an embodiment it is not necessary for the same modification to be performed in respect of each item of capability metadata, but instead the modifications can be specified on a finer granularity.

In one embodiment, the modification data provides a modification value for each capability metadata to be accessed by the bulk modification operation that identifies one of at least two of the following modifications: (i) set the capability metadata to identify that the associated data block specifies a capability; (ii) clear the capability metadata to identify that the associated data block specifies data other than a capability; and (iii) leave the capability metadata unchanged. Such an approach provides a great deal of flexibility as to how the individual items of capability metadata are updated during the bulk modification process.

Whilst in some embodiments the bulk capability metadata operation may be performed unconditionally, in an alternative embodiment the processing circuitry may be arranged to perform the bulk capability metadata operation subject to a condition being met. By enabling the performance of the bulk capability metadata operations to be made conditional, this can enhance the security of the process. For example, considering in particular a bulk modification operation, it will be appreciated that the ability to modify the capability metadata for multiple storage elements is a powerful tool, and it may be desired to constrain the ability to perform such a bulk modification to certain particular scenarios.

For example, in one embodiment, the condition may be determined to be met if at least one of the following conditions is true: (i) the processing circuitry is operating in a predetermined privileged state; (ii) a configuration storage element settable when the processing circuitry is operating in a predetermined privileged state has a value indicating that the bulk capability metadata operation is permitted; (iii) a request specifying the bulk capability metadata operation identifies a bulk operation capability, and the bulk operation capability indicates that the bulk capability metadata operation is permitted. By such an approach, it is possible to effectively constrain the scenarios in which the bulk capability metadata operation can be performed, if desired.

The storage elements whose capability metadata are manipulated by the bulk capability metadata operation can take a variety of forms. For example, the storage elements may in one embodiment be memory locations accessible to the processing circuitry.

In one embodiment, the plurality of memory locations may be specified by reference to a bounded pointer, and the processing circuitry is arranged to perform the bulk capability metadata operation when it is determined that the plurality of memory locations reside within an allowable range of addresses identified by the bounded pointer. Hence, independently of whether performance of the bulk capability metadata operation is made conditional, for example using any of the techniques discussed earlier, if a bounded pointer is also used to specify the memory locations, then an additional level of check can be performed by ensuring that the plurality of memory locations whose associated capability metadata is to be manipulated by the bulk capability metadata operation reside with an allowable range of addresses identified by the bounded pointer.

Whilst some bulk capability metadata operations may be implemented in respect of memory locations, in an alternative embodiment, or in addition, certain bulk capability metadata operations may be applied in respect of the capability metadata associated with capability registers accessible to the processing circuitry. Such capability registers can be arranged to store capabilities, for example the earlier-mentioned bounded pointers, and each capability register will have capability metadata associated with it to identify whether the current contents of that capability register do in fact represent a capability, or instead are to be treated as general purpose data.

There are a number of ways in which the bulk capability metadata operation can be specified. However, in one embodiment, a single instruction is used to specify each bulk capability metadata operation. For example, in one embodiment the apparatus may further comprise decode circuitry responsive to a sequence of instructions to generate control signals for issuing to the processing circuitry to cause the processing circuitry to perform operations required by said sequence of instructions. The decode circuitry may be arranged to be responsive to receipt of a bulk capability metadata instruction to generate control signals for issuance to the processing circuitry in order to cause the processing circuitry to perform the bulk capability metadata operation required by said bulk capability metadata instruction. Hence, the processing circuitry may for example be a processor core that responds to the control signals produced by the decode circuitry in order to perform operations required by the decoded instructions. When the decode circuitry decodes a bulk capability metadata instruction, the processing circuitry will be responsive to the resultant generated control signals to perform the bulk capability metadata operation that is required. It will be appreciated that such an approach can provide significant performance and code density benefits by enabling a single instruction to specify a bulk query and/or modification operation to be performed upon a plurality of items of capability metadata associated with an identified plurality of storage elements that may be either memory locations or registers.

There are a number of ways in which the plurality of storage elements whose capability metadata is to be accessed/manipulated by the bulk capability metadata operation can be specified within the instruction. For example, in one embodiment, the storage elements are memory locations and the bulk capability metadata instruction specifies a register providing an address identifying a consecutive series of memory locations whose associated capability metadata is to be subjected to the bulk capability metadata operation. The address specified by the register can take a variety of forms, but in one embodiment may for example be a start address.

There are various ways in which the number of memory locations in the consecutive series can be identified. For example, in one embodiment the bulk capability metadata instruction may include a field identifying the number of memory locations in the consecutive series. Hence, in such instances the instruction can explicitly identify the number of memory locations to be subjected to the bulk capability metadata operation.

The field that identifies the number of memory locations can take a variety of forms. For example, the field may provide a reference to a register that contains a value that is indicative of the number of memory locations in the consecutive series. Alternatively, an immediate value may be specified within the field, that directly indicates the number of memory locations in the consecutive series.

In an alternative embodiment, it may not be required that the bulk capability metadata instruction explicitly identifies the number of memory locations in the consecutive series. For example, in one embodiment that number of memory locations may be implicit from a property of the apparatus. The property of the apparatus that defines the number of memory locations can take a variety of forms, but in one embodiment the property is a cache line length of a cache accessible to the processing circuitry. Such an approach would enable, for example, the structure of a processor's data cache to be exploited. In particular, where such a cache augments the cache line information with the capability metadata for each data block located in the cache line, there would be potential to accelerate management operations on such capability metadata through the use of such an instruction, and this could for example be of use in optimising paging code used to move capabilities between the capability aware memory system and a backing store, or vice versa.

In one embodiment, the bulk capability metadata instruction identifies capability registers as the plurality of the storage elements. In such an embodiment, the bulk capability metadata instruction may include a register identifier field identifying the capability registers whose associated capability metadata is to be subjected to the bulk capability metadata operation, said register identifier field providing at least one of an immediate value and a register identifier in order to identify the capability registers. When performing such bulk operations on the capability metadata associated with a plurality of capability registers, there will typically be no requirement for the registers to be a consecutive sequence of registers, and accordingly there is a great deal of flexibility as to how the individual registers are identified. For example, a mask value could be used to identify the relevant registers, either as an immediate value, or with reference to a register containing the mask value. Alternatively, the combination of a base register identifier and a count value could be used to identify the registers, with either the base register identifier or the count value being specified with reference to a general purpose register, and with the other of the base register identifier and the count value for example being specified by an immediate value.

The bulk capability metadata instruction can take a variety of forms. In one embodiment, it takes the form of a bulk query instruction, and the processing circuitry is arranged to perform a bulk query operation in response to the control signals generated by the decode circuitry when decoding the bulk query instruction. The bulk query instruction may identify a destination register, and the processing circuitry is responsive to the bulk query operation to obtain the capability metadata associated with each data block stored in the plurality of said storage elements, and to generate output data containing the obtained capability metadata for storing in the destination register. Hence, in response to a single instruction, the capability metadata associated with a plurality of storage elements can be gathered together and stored within a single destination register.

In some instances, the bulk capability metadata instruction may be bulk modification instruction, and the processing circuitry is arranged to perform a bulk modification operation in response to the control signals generated by the decode circuitry when decoding the bulk modification instruction The bulk modification instruction may identify a source field identifying modification data, and the processing circuitry is responsive to the bulk modification operation to modify the capability metadata associated with each data block stored in the plurality of said storage elements, in dependence on the modification data identified by the source field.

The source field may identify the modification data in a variety of ways. For example, the source field may provide an immediate value and/or a register identifier in order to identify the modification data. In one embodiment, where the storage elements are memory locations, a general purpose register is identified containing the modification data. However, where the storage elements are capability registers, then in one embodiment either or both of an immediate value and a register identifier may be specified in order to identify the modification data. In a yet further embodiment, either or both of an immediate value and a register identifier may be used to identify the modification data also when the storage elements are memory locations.

In one embodiment where the processing circuitry is arranged to perform a bulk query operation as the bulk capability metadata operation, the processing circuitry may further be arranged to output data containing the obtained capability metadata for storage in a capability unaware storage device. It may output that data directly for storage in a capability unaware storage device, or initially that output data may be stored in a general purpose register from where it can be forwarded on to the capability unaware storage device.

In one embodiment where the processing circuitry is arranged to perform the bulk modification operation as the bulk capability metadata operation, the modification data used may be obtained from a capability unaware storage device. Whilst in one embodiment the modification data may be directly obtained from the capability unaware storage device, in an alternative embodiment it may first be written into a general purpose register from the capability unaware storage device, from where it is then referenced by the processing circuitry during performance of the bulk modification operation.

As an alternative to the processing circuitry being a processor core executing instructions decoded by associating decode circuitry, the processing circuitry may in an alternative embodiment be a direct memory access (DMA) circuit. In such an embodiment, the bulk capability metadata operation may be specified by a processor core, and cause the DMA circuit to issue one or more transactions to implement the bulk capability metadata operation on a consecutive series of memory locations. Hence, in such an embodiment, where a processor pipeline has access to memory which is also accessible to DMA circuitry, the processor pipeline may offload the bulk capability metadata operation to the DMA circuitry, with the DMA circuitry then implementing the required operations via a series of transactions between the DMA circuitry and the relevant memory locations. Hence, in such an embodiment, the bulk capability metadata operation is effectively expressed as the bus protocol level, permitting the DMA circuit to access/manipulate a set of items of capability metadata relating to a region of memory.

Particular embodiments will now be described with reference to the Figures.

Figure 1:
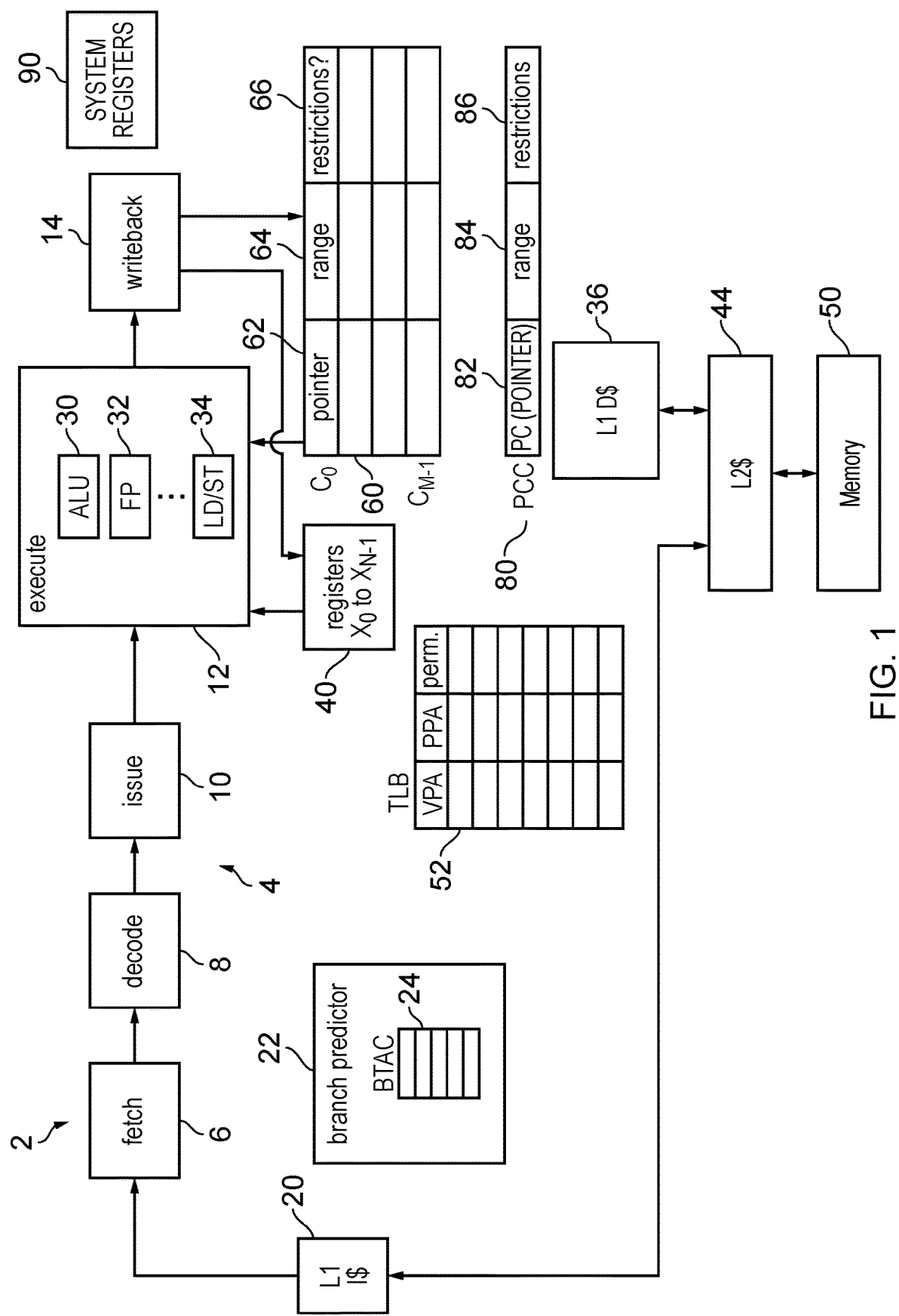
FIG. 1 is a block diagram of an apparatus in accordance with one embodiment.

FIG. 1 schematically illustrates an example of a data processing apparatus 2 comprising a processing pipeline 4 for processing instructions. In this example the processing pipeline 4 includes a number of pipeline stages including a fetch stage 6, a decode stage 8, an issue stage 10, an execute stage 12, and a write back stage 14, but it will be appreciated that other types or combinations of stages may be provided. For example a rename stage for performing register renaming could be included in some embodiments. Instructions to be processed move from stage to stage, and while an instruction is pending at one stage another instruction may be pending at a different stage of the pipeline 4.

The fetch stage 6 fetches instructions from a level 1 (L1) instruction cache 20. The fetch stage 6 may usually fetch instructions sequentially from successive instruction addresses. However, the fetch stage may also have a branch predictor 22 for predicting the outcome of branch instructions, and the fetch stage 6 can fetch instructions from a (non-sequential) branch target address if the branch is predicted taken, or from the next sequential address if the branch is predicted not taken. The branch predictor 22 may include one or more branch history tables for storing information for predicting whether certain branches are likely to be taken or not. For example, the branch history tables may include counters for tracking the actual outcomes of previously executed branches or representing confidence in predictions made for branches. The branch predictor 22 may also include a branch target address cache (BTAC) 24 for caching previous target addresses of branch instructions so that these can be predicted on subsequent encounters of the same branch instructions.

The fetched instructions are passed to the decode stage 8 which decodes the instructions to generate decoded instructions. The decoded instructions may comprise control information for controlling the execute stage 12 to execute the appropriate processing operations. For some more complex instructions fetched from the cache 20, the decode stage 8 may map those instructions to multiple decoded instructions, which may be known as micro-operations (μops or uops). Hence, there may not be a one-to-one relationship between the instructions fetched from the L1 instruction cache 20 and instructions as seen by later stages of the pipeline. In general, references to "instructions" in the present application should be interpreted as including micro-operations.

The decoded instructions are passed to the issue stage 10, which determines whether operands required for execution of the instructions are available and issues the instructions for execution when the operands are available. Some embodiments may support in-order processing so that instructions are issued for execution in an order corresponding to the program order in which instructions were fetched from the L1 instruction cache 20. Other embodiments may support out-of-order execution, so that instructions can be issued to the execute stage 12 in a different order from the program order. Out-of-order processing can be useful for improving performance because while an earlier instruction is stalled while awaiting operands, a later instruction in the program order whose operands are available can be executed first.

The issue stage 10 issues the instructions to the execute stage 12 where the instructions are executed to carry out various data processing operations. For example the execute stage may include a number of execute units 30, 32, 34 including an arithmetic/logic unit (ALU) 30 for carrying out arithmetic or logical operations on integer values, a floating-point (FP) unit 32 for carrying out operations on values represented in floating-point form, and a load/store unit 34 for carrying out load operations for loading a data value from a level 1 (L1) data cache 36 to a register 40 or store operations for storing a data value from a register 40 to the L1 data cache 36. It will be appreciated that these are just some examples of the types of execute units which could be provided, and many other kinds could also be provided. For carrying out the processing operations, the execute stage 12 may read data values from a set of registers 40. Results of the executed instructions may then be written back to the registers 40 by the write back stage 14.

The L1 instruction cache 20 and L1 data cache 36 may be part of a cache hierarchy including multiple levels of caches. For example a level two (L2) cache 44 may also be provided and optionally further levels of cache could be provided. In this example the L2 cache 44 is shared between the L1 instruction cache 20 and L1 data cache 36 but other examples may have separate L2 instruction and data caches. When an instruction to be fetched is not in the L1 instruction cache 20 then it can be fetched from the L2 cache 44 and similarly if the instruction is not in the L2 cache 44 then it can be fetched from main memory 50. Similarly, in response to load instructions, data can be fetched from the L2 cache 44 if it is not in the L1 data cache 36 and fetched from memory 50 if required. Any known scheme may be used for managing the cache hierarchy.

The addresses used by the pipeline 4 to refer to program instructions and data values may be virtual addresses, but at least the main memory 50, and optionally also at least some levels of the cache hierarchy, may be physically addressed. Hence, a translation lookaside buffer 52 (TLB) may be provided for translating the virtual addresses used by the pipeline 4 into physical addresses used for accessing the cache or memory. For example, the TLB 52 may include a number of entries each specifying a virtual page address of a corresponding page of the virtual address space and a corresponding physical page address to which the virtual page address should be mapped in order to translate the virtual addresses within the corresponding page to physical addresses. For example the virtual and physical page addresses may correspond to a most significant portion of the corresponding virtual and physical addresses, with the remaining least significant portion staying unchanged when mapping a virtual address to a physical address. As well as the address translation information, each TLB entry may also include some information specifying access permissions such as indicating whether certain pages of addresses are accessible in certain modes of the pipeline 4. In some embodiments, the TLB entries could also define other properties of the corresponding page of addresses, such as cache policy information defining which levels of the cache hierarchy are updated in response to read or write operations (e.g. whether the cache should operate in a write back or write through mode), or information defining whether data accesses to addresses in the corresponding page can be reordered by the memory system compared to the order in which the data accesses were issued by the pipeline 4.

While FIG. 1 shows a single level TLB 52, it will be appreciated that a hierarchy of TLBs may be provided so that a level one (L1) TLB 52 may include TLB entries for translating addresses in a number of recently accessed pages and a level two (L2) TLB may be provided for storing entries for a larger number of pages. When a required entry is not present in the L1 TLB then it can be fetched from the L2 TLB, or from further TLBs in the hierarchy. If a required entry for a page to be accessed is not in any of the TLBs then a page table walk can be performed to access page tables in the memory 50. Any known TLB management scheme can be used in the present technique.

Also, it will be appreciated that some systems may support multiple levels of address translation so that, for example, a first TLB (or hierarchy of TLBs) may be used to translate virtual addresses into intermediate addresses, and a second level of address translation using one or more further TLB(s) may then translate the intermediate addresses into physical addresses used to access a cache or memory. This can be useful for supporting virtualisation where the first level of address translation may be managed by the operating system and the second level of address translation may be managed by the hypervisor, for example.

As shown in FIG. 1, the apparatus 2 may have a set of bounded pointer registers 60. Whilst the set of bounded pointer registers is shown in FIG. 1 as being physically separate to the set of general purpose data registers 40, in one embodiment the same physical storage may be used to provide both the general purpose data registers and the bounded pointer registers.

Each bounded pointer register 60 includes a pointer value 62 that may be used to determine an address of a data value to be accessed, and range information 64 specifying an allowable range of addresses when using the corresponding pointer 62. The bounded pointer register 60 may also include restrictions information 66 (also referred to herein as permissions information) which may define one or more restrictions/permissions on the use of the pointer. For example the restriction 66 could be used to restrict the types of instructions which may use the pointer 62, or the modes of the pipeline 4 in which the pointer can be used. Hence, the range information 64 and restriction information 66 may be considered to define capabilities within which the pointer 62 is allowed to be used. When an attempt is made to use a pointer 62 outside the defined capabilities, an error can be triggered. The range information 64 can be useful for example for ensuring that pointers remain within certain known bounds and do not stray to other areas of the memory address space which might contain sensitive or secure information. In an embodiment where the same physical storage is used for both general purpose data registers and bounded pointer registers, then in one embodiment the pointer value 62 may for example be stored within the same storage location as used for a corresponding general purpose register.

Figure 2:
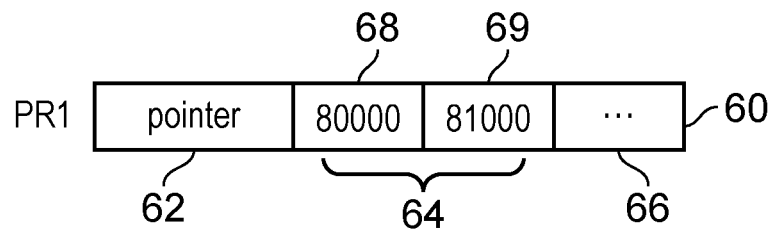
FIG. 2 shows examples of types of instruction for which an error may be triggered if there is an attempt to set or access a pointer value within the set of bounded pointer storage elements, where that pointer value is used to specify an address outside the range indicated by the associated range information.

FIG. 2 shows an example of types of instructions for which the allowable range is used to protect against unauthorised access to data or instructions. As shown in the top part of FIG. 2, a particular bounded pointer register PR1 includes a given pointer value 62 and range information 64, which in this example is specified using a lower bound address 68 defining the lower bound of the allowable range and an upper bound address 69 defining the upper bound of the allowable range. For example, the bounds 68, 69 are set to define a range of addresses 80000 to 81000. Errors may be triggered when certain instructions reference the bounded pointer register PR1 and the address determined from the pointer 62 is outside this range.

For example, as shown in part A of FIG. 2, in some systems an error may be triggered if there is an attempt to set the value of the pointer 62 in the pointer register 60 to a value lying outside the range specified by the range information 64 (here it being assumed that the pointer directly specifies an address). This avoids the pointer 62 taking any value outside the specified range so that any accesses using the pointer can be ensured to lie safely within the allowed range. Alternatively, as shown in part B of FIG. 2, an error can be triggered when an instruction attempts to access a location identified by the address of the pointer 62 when that address lies outside the specified range. Hence, it may still be allowable to set the pointer 62 to a value outside the specified range, but once a data access at the pointer address (or an address derived from the pointer) is attempted then an error may be triggered if the address lies outside the allowed range. Other systems may trigger errors in response to both the types of instruction shown in parts A and B of FIG. 2.

The range information 64 could be set in different ways. For example secure code, or an operating system or hypervisor, may specify the range allowed for a given pointer. For example, the instruction set architecture may include a number of instructions for setting or modifying the range information 64 for a given pointer 62, and execution of these instructions could be restricted to certain software or certain modes or exception states of the processor 4. Any known technique for setting or modifying the range information 64 could be used.

In addition to the set of bounded pointer storage elements 60 that may be used at the execute state 12 when executing certain instructions that make reference to a pointer, a program counter capability (PCC) register 80 may also be used to provide similar functionality at the fetch stage 6 when instructions are being fetched from the level one instruction cache 20. In particular, a program counter pointer may be stored in a field 82, with the PCC 80 also providing range information 84 and any appropriate restriction information 86, similar to the range and restriction information provided with each of the pointers in the set of bounded pointer storage elements 60.

Figure 3:
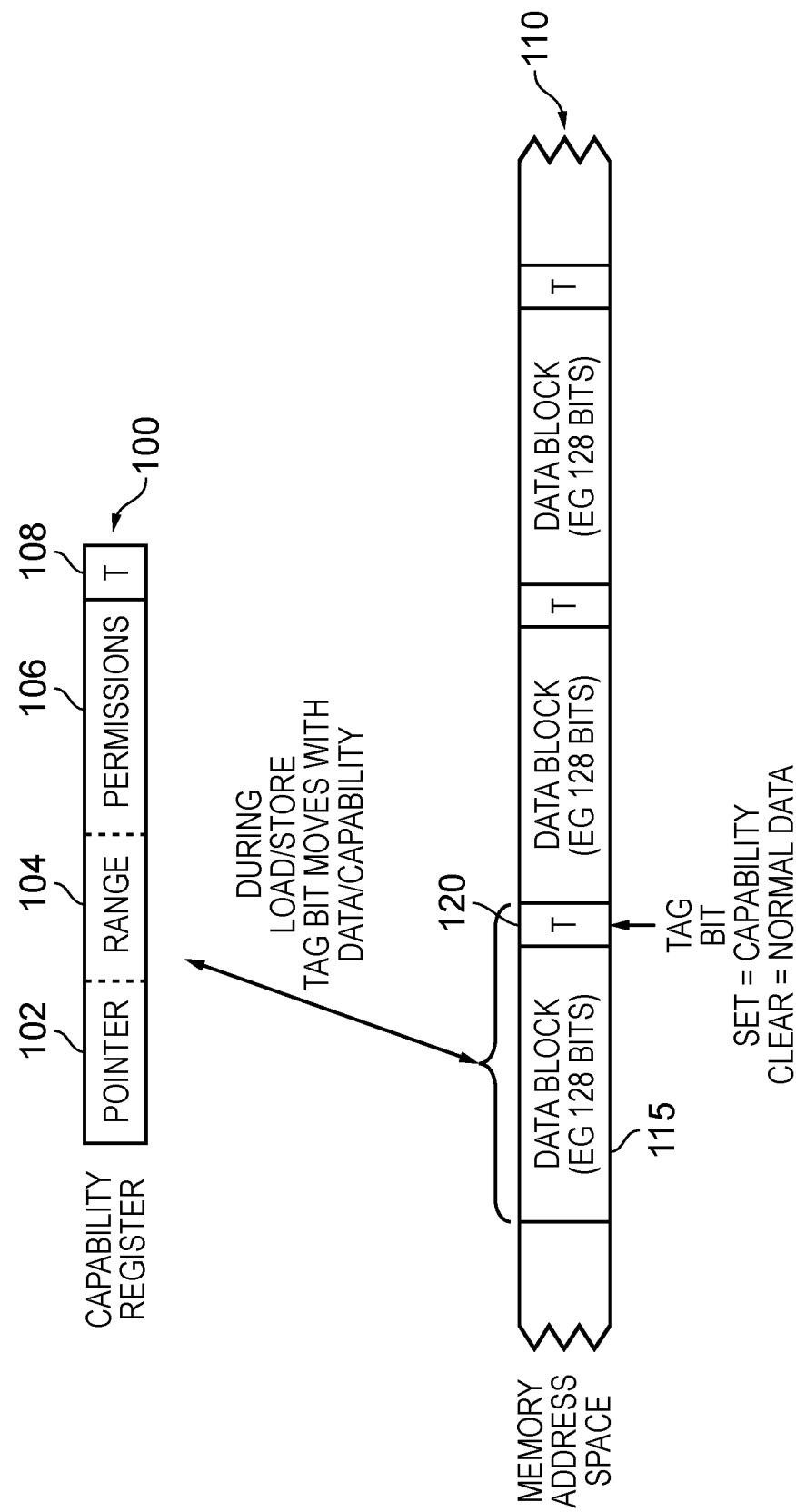
FIG. 3 illustrates the use of a tag bit in association with bounded pointers, in accordance with one embodiment.

FIG. 3 schematically illustrates how a tag bit is used in association with individual data blocks to identify whether those data blocks represent a capability (i.e. a bounded pointer and associated restrictions information), or represent normal data. In particular, the memory address space 110 will store a series of data blocks 115, which typically will have a specified size. Purely for the sake of illustration, it is assumed in this example that each data block comprises 128 bits. In association with each data block 115, there is provided a tag field 120, which in one example is a single bit field referred to as the tag bit, which is set to identify that the associated data block represents a capability, and is cleared to indicate that the associated data block represents normal data, and hence cannot be treated as a capability. It will be appreciated that the actual value associated with the set or the clear state can vary dependent on embodiment, but purely by way of illustration, in one embodiment if the tag bit has a value of 1, it indicates that the associated data block is a capability, and if it has a value of 0 it indicates that the associated data block contains normal data.

When a capability is loaded into one of the bounded pointer registers 60 (also referred to herein as a capability register), such as the capability register 100 shown in FIG. 3, then the tag bit moves with the capability information. Accordingly, when a capability is loaded into the capability register 100, the pointer 102, range information 104 and restrictions information 106 (hereafter referred to as the permissions information) will be loaded into the capability register. In addition, in association with that capability register, or as a specific bit field within it, the tag bit 108 will be set to identify that the contents represent a capability. Similarly, when a capability is stored back out to memory, the relevant tag bit 120 will be set in association with the data block in which the capability is stored. By such an approach, it is possible to distinguish between a capability and normal data, and hence ensure that normal data cannot be used as a capability.

Whilst in FIG. 3, a tag field containing a tag bit has been referred to, in a more general embodiment the tag bit is an example of capability metadata which may be associated with each capability. Hence, as shown in FIG. 4, a capability 150 stored in a storage element of the system (whether that be one of the capability registers 60 or a memory location within the memory address space 110) may have capability metadata 155 associated therewith. The capability metadata will identify whether the associated data block 150 does in fact represent a capability, or instead should be interpreted as general purpose data, and in one embodiment that information will be encoded as a tag bit within the capability metadata 155. The capability metadata may in one embodiment comprise solely the tag bit, but in alternative embodiments may comprise additional information if desired. For instance, types of data could be further sub-divided, with the capability metadata for example indicating ownership by a particular privilege level, fine-grained permissions, e.g read only, etc.

The capabilities can take a variety of forms, but in the embodiment shown in FIG. 4 the capability is a bounded pointer. As shown, the bounded pointer is made up of the pointer value 160, the range information 165 and the permission attributes 170. The range information and permissions attributes may collectively be referred to as the attributes of the bounded pointer.

In one embodiment, the execute pipeline 12 shown in FIG. 1 is arranged to execute instructions in order to perform bulk capability metadata operations on an identified plurality of storage elements, resulting in the performance of an operation on the capability metadata associated with each data block stored in the identified plurality of storage elements. The bulk capability metadata operation can take a variety of forms. For example, one form of the bulk capability metadata operation may be a bulk query operation, whilst another example form of the bulk capability metadata operation may be a bulk modification operation.

FIGS. 5A and 5B illustrate fields that may be provided within two different types of instructions that can be executed by the execute stage 12 in order to perform a bulk query operation on the items of capability metadata associated with a sequence of memory locations in the memory system. These memory locations may reside within the memory 50 shown in FIG. 1, or within one of the levels of cache 36, 44.

As shown in FIG. 5A, an instruction referred to as a CQueryTagsM instruction can be fetched via the level one instruction cache 20 of FIG. 1 for decoding by the decode stage 8 in order to produce a sequence of control signals which will subsequently control the execute stages 12 to perform a query operation on a plurality of tag bits associated with a plurality of data blocks identified by the instruction (in this embodiment it being assumed that each item of capability metadata comprises a tag bit, as for example discussed earlier with reference to FIG. 3). As shown in FIG. 5A, an opcode field 205 identifies the instruction as the CQueryTagsM instruction. A field 210 is used to identify an address from which the plurality of memory locations whose tag bits are to be queried can be determined. In one embodiment, that address is a start address for the sequence of memory locations, and that start address can be specified in either one of the capability registers 60 or one of the general purpose registers 40, with the field 210 including an identifier for that register. In one embodiment, the address will be aligned to a capability memory location, i.e. the start of one of the data blocks 115 shown within the memory address space 110 of FIG. 3. In an alternative embodiment, it may not be a requirement for the start address to be specified in an aligned manner, and instead any bits can be ignored that cause the specified address not to be aligned, hence effectively converting the address specified in the field 210 into an aligned address.

In the example of the instruction of FIG. 5A, the number of memory locations whose tag bits are queried is explicitly defined within the instruction through use of the field 215. In one embodiment, field 215 can identify a general purpose register whose contents identify the number of tags to be queried. Alternatively, an immediate value may be specified within the field 215 to directly identify the number of tags to be queried.

A further field 220 is then provided to identify a general purpose register 40 into which the query results are to be output. Hence, when the execute stage 12 performs a sequence of operations in order to retrieve the tag bits for each of the identified memory locations, those tag bits are then collated together into an output data value which is output for storage within one of the general purpose registers 40.

If desired, within the instruction 200 (and indeed within any of the instructions described herein), one of the source registers can be specified to be the same as a destination register. Hence for example, if a general purpose register is specified in the field 215 to identify the number of tags to be queried, that same general purpose register may be specified to be the register into which the query results are written (allowing for example fields 215, 220 to be combined to form a single field). This can reduce constraints on the encoding space requirements of the instruction.

Whilst in the example of the instruction 200 of FIG. 5A the number of memory locations whose tags are to be queried can be explicitly set, in an alternative embodiment that number may be implicit, and hence for example may be derived from a property of the apparatus on which the instructions are executed. An example of such an instruction is shown in FIG. 5B where the "DC_CQueryTagsM" instruction 225 is illustrated. The opcode 230 identifies the instruction to be the DC_CQueryTagsM instruction, whilst the field 235 serves the same purpose as the field 210 within the instruction 200 of FIG. 5A, and hence identifies a start address for a sequence of memory locations whose tag bits are to be queried. However, in this example there is no separate field to identify the number of tags to query, and instead the number of tags accessed during the bulk query operation is determined from the cache line length of the relevant data cache, such as the level one data cache 36 shown in FIG. 1 (the term "DC" as used in the instruction name is intended to convey that this is a type of bulk query instruction where the number of query tags is dependent on the cache line size of the data cache). The cache line size may for example be specified within one of the system registers available to the processor (denoted by reference numeral 90 in FIG. 1).

In one embodiment, the start address specified in the field 235 is aligned to the cache line length granularity and as a result, when the instruction is executed, the tag bits associated with each of the data blocks held within a cache line are queried and collated into an output value that is then output into a general purpose register specified within the field 240. Alternatively, if the start address specified in the field 235 is not aligned to the cache line length granularity, in an alternative embodiment the bits within the address causing the address to be unaligned may be ignored, hence effectively converting the address into an aligned address.

FIGS. 6A and 6B illustrate two example ways in which the tag bits associated with each data block may be incorporated within the cache line information of each cache line within the data RAM (Random Access Memory) of a data cache. In the example shown in FIG. 6A, the data RAM 250 includes a plurality of cache lines 255 where each cache line accommodates multiple data blocks (e.g. multiple of the 128-bit data blocks shown by way of example in FIG. 3). In the example shown in FIG. 6A, each tag bit is appended to the end of each data block (alternatively it could be prepended at the beginning of each data block). Hence the effective length of the cache line is extended to incorporate the necessary tag bit information.

Whilst in the embodiment shown in FIG. 6A, the various tag bits are located with their corresponding data blocks, in the alternative example shown in FIG. 6B the various tag bits are all accommodated within a final portion 270 of each cache line 265 of the data RAM 260. Hence, the data blocks in each cache line are appended one after the other, and the tag bit information is collated at the end of the cache line (it will be appreciated that in an alternative embodiment it could be collated at any appropriate point within the cache line, for example at the beginning of the cache line). It will be appreciated that FIGS. 6A and 6B are merely two example arrangements by which the tag bit information can be accommodated within the cache line contents, and it will be appreciated that any other suitable schemes could be adopted.

Whilst the instructions illustrated in FIGS. 5A and 5B are intended to operate on the tag bits associated with a sequence of memory locations, the apparatus may also support the execution of instructions that operate on capability registers in order to perform bulk tag query operations. One such instruction is shown in FIG. 7, and in particular the instruction CQueryTagsR 300 is specified, which is arranged to perform a query of multiple tag bits related to a series of capability registers (the "R" terminology at the end of the instruction denoting that it is operating on capability registers, as contrasted with the "M" terminology at the end of the instructions for FIGS. 5A and 5B illustrating that those instructions are operating in respect of memory locations).

The field 305 contains an opcode that identifies the instructions as the CQueryTagsR instruction. The field 310 is then used to identify the plurality of capability registers whose tag bits are to be queried. The way in which that plurality of capability registers is identified within the field 310 can vary dependent on embodiment. For example, they may be identified with reference to a general purpose register whose contents identify the plurality of registers to be queried, or by an immediate value specifically incorporated within the field 310. Indeed, a combination of a general purpose register and an immediate value may be used to specify the registers to be queried.

Two example ways of identifying the registers within the field 310 are illustrated schematically in the lower half of FIG. 7. In the first example, a mask value 320 is provided, which could for example be specified either by the contents of a general purpose register or by an immediate value. The mask value can be used to directly identify the registers to be queried. For instance, each bit of the mask value may correspond to one register within a register file, and whether that bit is set or clear determines whether that register is to have its tag bit queried. For example, each set bit may identify a register whose tag bit is to be queried. If there are multiple separate register files within the apparatus, then an optional register file identifier 325 may be specified to identify the register file to which the mask value 320 applies. It will be appreciated that through the use of such a mask value, it is possible to specify an arbitrary plurality of capability registers whose tag bits are to be queried.

In the alternative arrangement also shown in FIG. 7, the field 310 may actually incorporate two subfields, the first subfield 330 identifying a base register identifier, and the second subfield 335 identifying a count value. In combination, these fields can be used to identify a sequence of multiple registers starting from the register identified by the base register identifier. One of the subfields 330, 335 may use a general purpose register to identify its contents, whilst the other may for example provide an immediate value. Again, if multiple register files are provided within the apparatus, an optional further field 340 may be used to identify the particular register file whose registers are to be operated on.

As with the instructions of FIGS. 5A and 5B, the instruction 300 of FIG. 7 includes a field 315 where a general purpose register is identified into which the query results are to be written.

In the examples of FIGS. 5A, 5B and 7, the instructions are bulk query instructions, causing a bulk query operation to be performed in order to retrieve the tag bits associated with multiple storage elements, and then to output those tag bits for storage in a general purpose register. Another type of instruction that may be provided within the apparatus is a bulk modification instruction which, when executed in the execute stage 12 in response to control signals generated by the decode stage 8, causes the tag bits associated with each identified storage element to be selectively modified in accordance with modification data specified by the bulk modification instruction.

Three such bulk tag modification instructions are illustrated in FIGS. 8A, 8B and 8C, these corresponding generally to the equivalent bulk query instructions of FIGS. 5A, 5B and 7 respectively.

In particular, FIG. 8A illustrates a CModTagsM instruction 350 that can be used to perform a bulk tag modification operation on the tag bits associated with a sequence of memory locations, where the number of memory locations, and hence the number of tag bits to be operated on, is explicitly identified within the instruction. The opcode 355 hence identifies the instruction as the CModTagsM instruction, whilst the fields 360, 365 correspond generally with the fields 210, 215 of the instruction 200 of FIG. 5A. Hence, these two fields collectively identify a start address and the number of tags to be modified. Field 370 then identifies a general purpose register containing the modification data, and hence providing an indication of the updated tag values to be applied during the bulk tag modification operation. More details as to the manner in which the bits specified within the general purpose register identified within the field 370 can be used to determine the tag bit modifications to be made will be discussed later with reference to FIG. 10.

FIG. 8B illustrates the format of a DC_CModTagsM instruction 375 that again can be used to perform a bulk tag modification on the tag bits associated with a sequence of memory locations, but in this example the number of tag bits to be operated on is implicit from a property of the apparatus, in particular from the cache line length of a cache line within one of the data caches of the apparatus. The opcode 380 identifies the instruction as being the DC_CModTagsM instruction, whilst the field 385 serves the same purpose as the field 235 of the instruction 225 of FIG. 5B, and hence identifies a start address for the sequence of memory locations. The field 390 serves the same purpose as the field 370 and hence identifies the general purpose register whose contents identify how the tag values are to be updated during the bulk tag modification operation.

Whilst the instructions of FIGS. 8A and 8B cause bulk tag modification operations to be performed on a sequence of memory locations, the instruction shown in FIG. 8C instead operates on the tag bits associated with a plurality of capability registers within the set of capability registers 60. In particular, FIG. 8C shows a CModTagsR instruction 400, where the opcode 405 identifies the instruction as being the CModTagsR instruction. The field 410 serves the same purpose as the field 310 of the instruction 300 of FIG. 7, and accordingly identifies the plurality of registers whose tag bits are to be subjected to the bulk modification operation. Field 415 then identifies how the tag values are to be modified during the bulk tag modification operation. Whilst the field 415 may merely contain a reference to a general purpose register, in the same way as the fields 370, 390 of the instructions shown in FIG. 8A and FIG. 8B, in an alternative embodiment the field 415 could specify an immediate value, or a combination of an immediate value and a general purpose register could be used to identify the modifications to be made. Whilst in principle the fields 370, 390 of the instructions shown in FIGS. 8A and 8B could also use a combination of general purpose register and immediate value to identify the updates to be made, it has been found that the use of a general purpose register in combination with an immediate value may be more useful when performing bulk tag modifications on capability register contents, given the non-contiguous nature of the capability registers that can be specified for subjecting to the bulk tag modification operation.

The manner in which the tag bits are stored within the general purpose register that is identified for the query results when performing a bulk tag query operation, or the manner in which the modification data bits are expressed within the general purpose register identified for a bulk tag modification operation, can take a variety of forms. FIG. 9A illustrates a packed format, where each bit, starting from the least significant bit, identifies a queried tag bit (when the register is used to accumulate the results of a bulk tag query operation) or an individual item of modification data (when the general purpose register is used as a source register to identify the modification data used during a bulk tag modification operation). Hence, within the general purpose register 420, a sequence of bits 425 are provided. The number of active bits within the register will depend on the number of storage elements whose tag bits are being queried or modified, and accordingly some of the more significant bits of the register 420 may be unused. Whilst in FIG. 9A the packed format is shown starting from the least significant bit position, it will be appreciated that in an alternative embodiment that packed format may start from the most significant bit, and hence a certain number of the least significant bits may be unused.

FIG. 9B illustrates an alternative approach where the general purpose register 430 contains a sequence of blocks of information, in this example a sequence of individual bytes, and a certain bit 435 in each byte is used to identify one of the tag bits queried (in the example of a bulk tag query operation) or one of the items of modification data (in the example of a bulk tag modification operation). The other bits within each byte may be used for other information if required, or may be unused.

FIG. 10 is a diagram illustrating in more detail how the modification data bits may be used to identify the updates to be made to individual tag bits during the performance of a bulk tag modification operation. For the purpose of illustration, the packed format of FIG. 9A is shown, but the principles apply equally to the unpacked format of FIG. 9B. Four example options for interpreting the sequence of bits 425 are shown in FIG. 10. Each bit 425 corresponds to one of the tag bits that is to be modified. In accordance with option A, if the bit 425 is at a logic 0 value, then the corresponding tag bit is cleared to identify that the associated data block does not represent a capability. Conversely, if the bit 425 is at a logic 1 value, then the corresponding tag bit is set to identify that the associated data block is to be interpreted as a capability. In embodiments where tag bits are set to a logic 1 value to identify that the corresponding data block is a capability, and are cleared to a logic 0 value to identify that the associated data block is not a capability, then the update can effectively be performed via a move operation, whereby the content of the relevant bit 425 within the register 420 is moved into the corresponding tag bit during the bulk tag update operation.

Option B illustrates a scenario where if the bit 425 is at a logic 0 value, then the corresponding tag bit is left unmodified. Hence, that corresponding tag bit will be retained in the set state if it is already set, but otherwise will be retained in the clear state. Conversely, if the bit 425 has a logic 1 value, then this will cause the tag bit to be cleared. In one embodiment this option can be implemented through the use of a BIC (BIt Clear) operation.

In accordance with option C, if the bit 425 is at a logic 0 value, the corresponding tag bit is left unmodified, whereas if the bit 425 is at a logic 1 value, then the tag bit is set. This option can be implemented through the use of a ORR operation in one embodiment.

Option D illustrates a further option that could in principle be used if desired, but may have less practical application to the modification of capability tag bits than the other options A through C. In accordance with option D, if the bit 425 has a logic 0 value, the corresponding tag bit is left unmodified, whereas if the bit 425 has a logic 1 value, then the value of the corresponding tag bit is swapped, and hence is cleared if it is already set, and is set if it is already cleared. Such an operation can be implemented by an XOR operation in one embodiment.

Whilst in one embodiment the performance of the bulk tag operation may be unconditional, in an alternative embodiment the apparatus may be arranged such that certain conditions have to be met before the bulk tag operation is allowed to proceed. FIG. 11 is a flow diagram illustrating an example implementation where one or more checks are performed prior to allowing the bulk tag instruction to be executed. At step 450 it is determined whether a bulk tag instruction has been received. At step 455 it is then determined whether the bulk operation required by the specified instruction is allowed to be executed. In particular, as will be discussed later by way of example with reference to FIGS. 12A to 12C, various restrictions can be placed on when at least some of the bulk tag instructions can be executed.

The restrictions may apply equally to all types of bulk tag instruction, or more onerous restrictions may be placed on the use of certain types of bulk tag instructions. For example, it may in some implementations be appropriate to place quite tight restrictions on the use of bulk tag modification instructions, whereas the use of bulk tag query instructions may be less constrained. This is due to the fact that it will often be important to tightly control the ability to modify the tag bits associated with data blocks, as the security afforded by capability-based architectures could potentially be compromised if such controls are not placed on the ability to convert general purpose data into a capability. In particular, the execution of the bulk tag modification instruction is potentially quite a powerful tool, since it could enable multiple capabilities to be created by setting of the tag bits in association with multiple blocks of data.

If it is determined at step 455 that the bulk operation required by the instruction is not allowed, then a fault condition is determined to occur at step 465. This may for example involve raising a processor fault by taking an exception.

If it is determined that the bulk operation required by the instruction is allowed, then optionally at step 460 any other required checks can be performed. For example, if a bounded pointer is used to identify the start address for a bulk tag operation to be performed on a sequence of memory locations, then the range and permission attributes of the bounded pointer will be checked to ensure that the sequence of memory locations identified by the bulk tag instruction are within the permissible range, and that any permission attributes are satisfied. As another example of further checks that could be performed at step 460, any memory management unit (MMU) access permissions could be checked to ensure that those access permissions are satisfied. A further check may be made to ensure that no memory faults occur in respect of the memory address range determined. If any of the other required checks are not passed, then the process again proceeds to step 465 where a fault condition occurs. However, otherwise, the process proceeds to step 470 where the bulk operation required by the specified bulk tag instruction is performed.

FIGS. 12A to 12C illustrate some example restrictions that may be placed on the use of bulk tag instructions, in particular each of FIGS. 12A to 12C illustrating steps that can be taken to implement step 455 of FIG. 11 in different embodiments. Considering first FIG. 12A, at step 500 the bulk operation requested by the bulk tag instruction is identified. Then, at step 505 it is determined whether the processor is operating in a predetermined elevated privileged state. The predetermined elevated privileged state may take a variety of forms depending on embodiment, but considering for example a virtual machine type environment, the predetermined elevated privileged state may be the hypervisor level. If the processor is determined not to be operating in the predetermined elevated privileged state, then the process proceeds to step 515, where a fault occurs. Step 515 corresponds to step 465 of FIG. 11. However, if the processor is in the predetermined elevated privileged state, then the bulk operation is performed at step 510 subject to any further checks that need to be performed (such as the checks discussed earlier with reference to step 460 of FIG. 11).

FIG. 12B illustrates an alternative approach, where steps 520, 530 and 535 correspond to steps 500, 510 and 515 of FIG. 12A, but where the test 505 is replaced by the test 525, and in particular it is determined whether a privileged configuration register has been set to allow the identified bulk operation to be performed. The privileged configuration register may for example be a register that is settable by the processor when operating in a predetermined privileged state, and accordingly its value can only be modified by the processor operating in that predetermined privileged state. Assuming the contents of the configuration register indicate that the identified bulk operation is allowed, then the process proceeds to step 530, but otherwise a fault is raised at step 535.

As mentioned earlier, different restrictions may be placed on different types of bulk tag operation. Hence, different privileged configuration registers, or different fields within a privileged configuration register, can be used to identify the permissions for different types of bulk operation. Hence, for example, the privileged configuration register(s) may identify that bulk tag query operations are allowed but that bulk tag modification operations are not.

FIG. 12C illustrates another alternative approach where a bulk operation capability is defined. As mentioned earlier, capabilities effectively identify a set of rights that are available to the processor, and whilst most capabilities may take the form of the earlier-described bounded pointers, not all capabilities need to be a bounded pointer. Instead a capability may be defined that merely identifies certain rights in relation to particular functionality. Hence, a bulk operation capability may be defined, which could for example be held within one of the capability registers 60, and be specified as an input for a bulk tag operation. Hence, a bulk tag instruction could for example identify as one of its operands the bulk operation capability, in addition to specifying the various other operands discussed earlier. In such an arrangement, following step 540 where the bulk operation requested is identified, the bulk operation capability identified by the bulk tag instruction is retrieved from the relevant capability register at step 545 and then analysed to determine its contents. Then, at step 550 it is determined whether the bulk operation capability allows the identified bulk operation to be performed. If it does, then the process proceeds to step 555, whereas otherwise a fault is raised at step 560.

The bulk operation capability may have a permission bit set to indicate that any form of bulk tag operation is permitted or not, or instead may provide different permission bits for bulk tag modifications and for bulk tag query operations.

The bulk operation capability may also identify range information that can be checked against in respect of bulk tag operations that are to be performed on a sequence of memory locations, with a fault again being raised at step 560 if that range information is not conformed to. However, in one embodiment, such range information is not required within the bulk operation capability, and instead when adopting the instruction formats discussed earlier with reference to FIGS. 5A, 5B, 8A or 8B, a capability register can be used to identify the start address of the sequence of memory locations, and that capability register's range information can be checked against as part of the subsequent step 460 of FIG. 11.

As discussed earlier, for example with reference to FIG. 3, when capabilities are moved between memory and the capability registers, the tag bit moves with the capability to identify that the associated block of data is in fact a capability. However, in some implementations it may be necessary to store capabilities from memory into a backing store such as a disk, due for example to there being insufficient space to retain all of the capability information within the memory, or when supporting hibernation. In one embodiment, this involves decomposing each capability into separate data and tag portions, and treating the tag as data within the backing store. This is illustrated schematically in FIG. 13, where, as per the approach described earlier with reference to FIG. 3, when capabilities are moved between the capability registers 600 and memory 605, then the tag bit 615 moves with each data block 610. Hence each block of data in memory 605 can be identified as representing either a capability or general purpose data. When a data block is moved to the backing store 625, then a decomposition process 620 is used to decompose the capability into data 624 and tag information 622, the tag information being treated as data. Accordingly, within the backing store the information merely persists as data, and the backing store is capability unaware.

When reconstructing capabilities from data stored in the backing store, a reconstruction process 630 needs to be performed, which can be constrained in order to ensure that the security that is available through the use of capabilities is not compromised. As will be discussed in more detail later with reference to FIG. 15, the earlier-described bulk tag modification instructions can be used for such capability reconstruction purposes, and the use of those instructions can be constrained through use of the methodology discussed earlier with reference to FIG. 11 (for example using the techniques described earlier with reference to FIGS. 12A to 12C to implement step 455 of FIG. 11). Assuming it is determined at the time the reconstruction operation 630 is requested that the reconstruction operation can be performed, then the capabilities can be reconstructed at step 630 and written back into the shared memory 605 (as will be discussed in more detail later, in one embodiment the reconstruction takes place using the capability registers, prior to the reconstructed capabilities then being output into the shared memory 605).

FIG. 14 is a flow diagram illustrating the decomposition process, with the schematic in the right hand side of FIG. 14 further illustrating the process performed by each of the steps shown in the flow diagram.

At step 650, a bulk tag query instruction is executed in order to gather the tag values for multiple storage locations into a general purpose register. Hence, as shown in the right hand side of FIG. 14, for a contiguous sequence of memory locations within the memory address space 665, the tag bits may be accessed and retrieved, and then collated for storage within the general purpose register 670.

Then, at step 655, the contents of that general purpose register 670 are written out to the backing store 675. At this point, the backing store threats that data merely as general purpose data and is unaware of capabilities.

At step 660, standard write operations are then used to write out to the backing store 675 each of the data blocks within the sequence of memory locations whose associated tag bits were subjected to the bulk tag query operation at step 650. In one embodiment, the implementation will involve loading those data blocks from the memory address space into registers, and then writing them out from the registers to the backing store.

FIG. 15 is a flow diagram illustrating the reconstruction operation 630 of FIG. 13 in accordance with one embodiment. As with FIG. 14, the schematic on the right hand side of FIG. 15 illustrates the operations performed at each of the steps of FIG. 15. At step 700, a series of load operations are used to load multiple data blocks from the backing store 720 into a corresponding multiple set of capability registers within the capability registers 725, with the tag bits associated with those capability registers being cleared to logic 0 values to identify that the data blocks do not currently represent capabilities.

Thereafter at step 705, a load operation is used to load into a general purpose register 730 data from the backing store 720 that represents multiple tag values, in particular the tag values that are to be associated with each of the data blocks loaded into the capability register 725.

Then, at step 710 a bulk tag modification process is performed, for example by executing the bulk tag modification instruction discussed earlier with reference to FIG. 8C where the identified capability registers are the relevant ones from the set of capability registers 725. The instruction also identifies the general purpose register 730 as containing the modification data to be used during the bulk tag modification operation. As per the earlier discussion of FIG. 11, one or more checks may be performed during performance of step 710 in order to check that the identified bulk tag modification operation is allowed to proceed. However, assuming those checks are passed, then at step 710 performance of the bulk tag modification operation will cause the tag values associated with each of the relevant capability registers 725 to be modified dependent on the data held in the general purpose register 730. This may cause multiple of the data blocks to be identified as capabilities (in one embodiment all of the data blocks may have their tag bits set to identify that they are capabilities). Accordingly, during performance of step 710, the capabilities are effectively recreated from the information that has been retrieved from the backing store 720. Thereafter at step 715, the capability register contents can be moved, along with their associated tag bits, to the memory address space 735.

Whilst in the embodiment discussed with reference to FIG. 15, the modification data used to update the tags is first stored into a general purpose register 730, in an alternative embodiment the bulk tag modification operations may be modified so that the tag values may be loaded directly from memory into the relevant capability register tag locations. In a similar way, operations may be provided to store capability tag information directly from the capability registers as a block of general purpose data into memory (without using an intervening general purpose register).

FIG. 16 illustrates an alternative embodiment where, rather than the processor core executing bulk tag instructions in order to perform bulk tag query or bulk tag modification operations, the processor core is able to offload that task to associated DMA circuitry. In particular, as shown in FIG. 16, a processor pipeline 750 is connected via a memory management unit 755 with one or more levels of cache 760, and then via an interconnect 765 with memory 770. The MMU 755 may incorporate the TLB structures 52 discussed earlier with reference to FIG. 1, and accordingly converts virtual addresses issued by the processor pipeline into physical addresses forwarded onto the cache/memory system. In accordance with this embodiment, when the processor pipeline desires to perform a bulk tag query or modification operation, it may issue an appropriate request via the dotted path 780 to the DMA circuitry 775 providing sufficient information to enable the DMA circuitry to identify the type of operation required and the sequence of memory addresses whose tag bits are to be subjected to the bulk tag operation. The DMA circuitry then issues a sequence of transactions 780 via the interconnect 765 to the memory system 770 in order to implement the bulk tag query or modification operation. Each transaction will involve the issuance of a request from the DMA circuitry to memory, along with at least one response from the memory 770 back to the DMA circuit 775. For a bulk tag query operation, the response may incorporate the tag information that has been queried. For a bulk tag modification operation, the request issued by the DMA circuit will be accompanied by the necessary modification data required to update the tag bits in memory, and the response will take the form of an acknowledgement signal from the memory system to confirm that the modification has been performed.

In accordance with this embodiment, the bulk tag query/modification operations are expressed at the bus protocol level, enabling a bus master device such as the DMA circuit 775 to perform such operations on behalf of the processor pipeline 750.

FIG. 17 illustrates a virtual machine implementation that may be used. Whilst the earlier described embodiments implement the present techniques in terms of apparatus and methods for operating specific processing hardware supporting the techniques concerned, it is also possible to provide so-called virtual machine implementations of hardware devices. These virtual machine implementations run on a host processor 830 typically running a host operating system 820 supporting a virtual machine program 810. Often, large powerful processors are required to provide virtual machine implementations which execute at a reasonable speed, but such an approach may be justified in certain circumstances, such as when there is a desire to run code native to another processor for compatibility or re-use reasons. The virtual machine program 810 provides a virtual hardware interface to a guest program 800 which is the same as the hardware interface which would be provided by the real hardware which is the device being modelled by the virtual machine program 810. Thus, the program instructions, including the bulk tag/bulk capability metadata instructions described above, may be executed from within the guest program 800 using the virtual machine program 810 to model their interaction with the virtual machine hardware. The guest program 800 may be a bare metal program, or alternatively it may be a guest operating system that runs applications in a similar way to how host OS 820 runs the virtual machine application 810. It will also be appreciated that there are different types of virtual machine, and in some types the virtual machine runs directly on the host hardware 830 without the need for a host OS 820.

From the above-described embodiments, it will be appreciated that such embodiments enable more optimal access to capability metadata such as tag bits in a capability architecture. The described operations can be useful in a variety of scenarios, for example when paging memory to tagged memory locations from a backing store, or from those tagged memory locations to a backing store, or when migrating virtual machines across a network lacking intrinsic capability support. The described embodiments set out a number of instructions that can be executed to allow a range of capability locations to be queried or manipulated in bulk. Two separate groups of instructions are described, one applying operations in bulk to capability memory locations, and one applying operations in bulk to capability register locations.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus, comprising:
storage elements to store data blocks, each data block having capability metadata associated therewith identifying whether said data block specifies a capability, at least one capability type being a bounded pointer; and
processing circuitry, responsive to a single bulk capability metadata instruction identifying a plurality of said storage elements, to perform an operation on the capability metadata associated with each data block stored in said plurality of storage elements,
wherein the single bulk capability metadata instruction is one of:
a bulk query instruction, and the processing circuitry is responsive to the bulk query instruction to obtain the capability metadata associated with each data block stored in said plurality of said storage elements, and to generate output data containing the obtained capability metadata, and
a bulk modification instruction, and the processing circuitry is responsive to the bulk modification instruction to modify the capability metadata associated with each data block stored in said plurality of said storage elements, in dependence on modification data specified for said bulk modification instruction.

2. An apparatus as claimed in claim 1, wherein the bulk modification instruction causes the capability metadata associated with each data block stored in said plurality of said storage elements to be set to identify that each data block specifies a capability.

3. An apparatus as claimed in claim 1, wherein the bulk modification instruction causes the capability metadata associated with each data block stored in said plurality of said storage elements to be cleared to identify that each data block specifies data other than a capability.

4. An apparatus as claimed in claim 1, wherein the modification data identifies, for each capability metadata to be accessed by the bulk modification instruction, the modification to be performed in respect of that capability metadata.

5. An apparatus as claimed in claim 4, wherein the modification data provides a modification value for each capability metadata to be accessed by the bulk modification instruction that identifies one of at least two of the following modifications:
(i) set the capability metadata to identify that the associated data block specifies a capability;
(ii) clear the capability metadata to identify that the associated data block specifies data other than a capability; and
(iii) leave the capability metadata unchanged.

6. An apparatus as claimed in claim 1, wherein the processing circuitry is arranged to perform the single bulk capability metadata instruction subject to a condition being met.

7. An apparatus as claimed in claim 6, wherein the condition is determined to be met if at least one of the following conditions is true:
(i) the processing circuitry is operating in a predetermined privileged state;
(ii) a configuration storage element settable when the processing circuitry is operating in a predetermined privileged state has a value indicating that the single bulk capability metadata instruction is permitted;

(iii) a request specifying the single bulk capability metadata instruction identifies a bulk operation capability, and said bulk operation capability indicates that the single bulk capability metadata instruction is permitted.

8. An apparatus as claimed in claim 1, wherein the storage elements are memory locations.

9. An apparatus as claimed in claim 8, wherein the plurality of memory locations are specified by reference to a bounded pointer, and the processing circuitry is arranged to perform the single bulk capability metadata instruction when it is determined that the plurality of memory locations reside within an allowable range of addresses identified by the bounded pointer.

10. An apparatus as claimed in claim 1, wherein the storage elements are capability registers accessible to the processing circuitry.

11. An apparatus as claimed in claim 1, further comprising:
decode circuitry responsive to a sequence of instructions to generate control signals for issuing to the processing circuitry to cause the processing circuitry to perform operations required by said sequence of instructions;
the decode circuitry being responsive to receipt of the single bulk capability metadata instruction to generate control signals for issuance to the processing circuitry in order to cause the processing circuitry to perform the single bulk capability metadata instruction.

12. An apparatus as claimed in claim 11, wherein the storage elements are memory locations and the bulk capability metadata instruction specifies a register providing an address identifying a consecutive series of memory locations whose associated capability metadata is to be subjected to the single bulk capability metadata instruction.

13. An apparatus as claimed in claim 12, wherein the bulk capability metadata instruction includes a field identifying a number of memory locations in said consecutive series.

14. An apparatus as claimed in claim 13, wherein said field provides one of a reference to a register containing a value indicative of the number of memory locations in said consecutive series, and an immediate value indicating the number of memory locations in said consecutive series.

15. An apparatus as claimed in claim 12, wherein a number of memory locations in said consecutive series is implicit from a property of said apparatus.

16. An apparatus as claimed in claim 15, wherein said property is a cache line length of a cache accessible to said processing circuitry.

17. An apparatus as claimed in claim 11, wherein the storage elements are capability registers, and the bulk capability metadata instruction includes a register identifier field identifying the capability registers whose associated capability metadata is to be subjected to the single bulk capability metadata instruction, said register identifier field providing at least one of an immediate value and a register identifier in order to identify the capability registers.

18. An apparatus as claimed in claim 17, wherein said register identifier field provides one of:
a mask value used to identify the capability registers;
a base identifier and a count value used in combination to identify the capability registers.

19. An apparatus as claimed in claim 11 wherein:
the single bulk capability metadata instruction is the bulk query instruction, and the processing circuitry is arranged to perform the bulk query instruction in response to the control signals generated by the decode circuitry when decoding the bulk query instruction;
the single bulk query instruction identifies a destination register, and the processing circuitry is responsive to the bulk query instruction to obtain the capability metadata associated with each data block stored in said plurality of said storage elements, and to generate output data containing the obtained capability metadata for storing in said destination register.

20. An apparatus as claimed in claim 11 wherein:
the bulk capability metadata instruction is the bulk modification instruction, and the processing circuitry is arranged to perform the bulk modification instruction in response to the control signals generated by the decode circuitry when decoding the bulk modification instruction;
the bulk modification instruction identifies a source field identifying the modification data, and the processing circuitry is responsive to the bulk modification instruction to modify the capability metadata associated with each data block stored in said plurality of said storage elements, in dependence on said modification data identified by the source field.

21. An apparatus as claimed in claim 20, wherein the source field provides at least one of an immediate value and a register identifier in order to identify said modification data.

22. An apparatus as claimed in claim 1, wherein the processing circuitry is arranged to perform, as the single bulk capability metadata instruction, the bulk query instruction, in order to obtain the capability metadata associated with each data block stored in said plurality of said storage elements, the processing circuitry further being arranged to output data containing the obtained capability metadata for storage in a capability-unaware storage device.

23. An apparatus as claimed in claim 1, wherein the processing circuitry is arranged to perform, as the single bulk capability metadata instruction, the bulk modification instruction, in order to modify the capability metadata associated with each data block stored in said plurality of said storage elements, in dependence on modification data obtained from a capability-unaware storage device.

24. An apparatus as claimed in claim 1, wherein:
the processing circuitry is a direct memory access (DMA) circuit; and
the single bulk capability metadata instruction is specified by a processor core, and causes the DMA circuit to issue one or more transactions to implement the single bulk capability metadata instruction on a consecutive series of memory locations.

25. A method of performing operations on capability metadata, comprising:
storing data blocks in storage elements, each data block having capability metadata associated therewith identifying whether said data block specifies a capability, at least one capability type being a bounded pointer; and
responsive to a single bulk capability metadata instruction identifying a plurality of said storage elements, causing processing circuitry to perform an operation on the capability metadata associated with each data block stored in said plurality of storage elements,
wherein the single bulk capability metadata instruction is one of:
a bulk query instruction, where in response to the bulk query instruction, the processing circuitry obtains the capability metadata associated with each data block stored in said plurality of said storage elements, and generates output data containing the obtained capability metadata, and a bulk modification instruction, wherein in response to the bulk modification instruction, the processing circuitry modifies the capability metadata associated with each data block stored in said plurality of said storage elements, in dependence on modification data specified for said bulk modification instruction.

26. An apparatus, comprising:
storage element means for storing data blocks, each data block having capability metadata associated therewith identifying whether said data block specifies a capability, at least one capability type being a bounded pointer; and
processing means for performing, responsive to a single bulk capability metadata instruction identifying a plurality of said storage element means, an operation on the capability metadata associated with each data block stored in said plurality of storage element means,
wherein the single bulk capability metadata instruction is one of:
a bulk query instruction, wherein the processing means is responsive to the bulk query instruction to obtain the capability metadata associated with each data block stored in said plurality of said storage element means, and to generate output data containing the obtained capability metadata, and
a bulk modification instruction, wherein the processing means is responsive to the bulk modification instruction to modify the capability metadata associated with each data block stored in said plurality of said storage element means, in dependence on modification data specified for said bulk modification instruction.

27. A computer program product storing in a non-transitory form a computer program for controlling a computer to provide a virtual machine execution environment for program instructions corresponding to an apparatus as claimed in claim 1.

* * * * *